United States Patent [19]
Fujimura et al.

[11] Patent Number: 5,480,105
[45] Date of Patent: Jan. 2, 1996

[54] SEAT BELT RETRACTOR

[75] Inventors: Yoshiichi Fujimura, Shiga; Hideaki Yano, Ohtsu; Shizutaka Matsuura, Shiga, all of Japan

[73] Assignee: Takata Corporation, Tokyo, Japan

[21] Appl. No.: 285,427

[22] Filed: Aug. 4, 1994

[30] Foreign Application Priority Data

Nov. 24, 1993 [JP] Japan ................................. 5-293483

[51] Int. Cl.⁶ .................................................. B60R 22/405
[52] U.S. Cl. .................................... 242/383.2; 242/384.5
[58] Field of Search ............................ 242/383.2, 383.5, 242/384, 384.2, 384.5, 384.6; 280/806; 297/478

[56] References Cited

U.S. PATENT DOCUMENTS

| | | | |
|---|---|---|---|
| 5,135,182 | 8/1992 | Park | 242/383.2 |
| 5,277,377 | 1/1994 | Fujimura et al. | 242/383.2 |
| 5,348,248 | 9/1994 | Butenop | 242/383.2 |
| 5,388,780 | 2/1995 | Matsuki | 242/384 |

*Primary Examiner*—John M. Jillions
*Attorney, Agent, or Firm*—Kanesaka & Takeuchi

[57] ABSTRACT

In a seat belt retractor according to the present invention, a lock gear first cover 13 has a projection 13a formed in a relatively large ring shape. The projection 13a has teeth 13c formed all around the inner surface thereof at same intervals. These teeth 13c are formed to have the same positional relation with the teeth 2f formed on the right-hand side wall 2a. Further the number of the teeth 13c is set to be a common divisor of the number of the teeth 2f, that is to be less than the number of the teeth 2f. Thereby, the frequency of occurrence of end lock decreases.

7 Claims, 18 Drawing Sheets

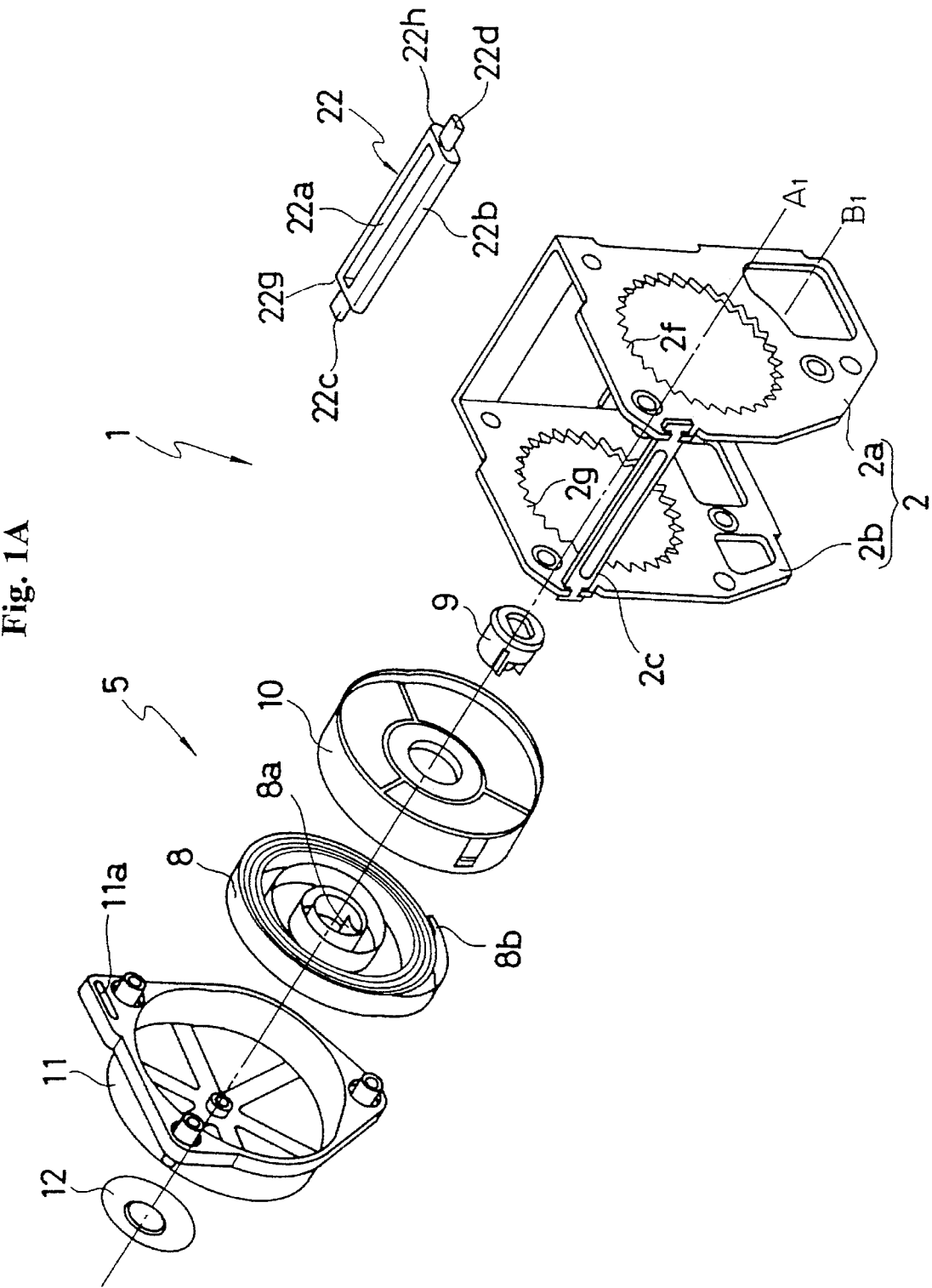

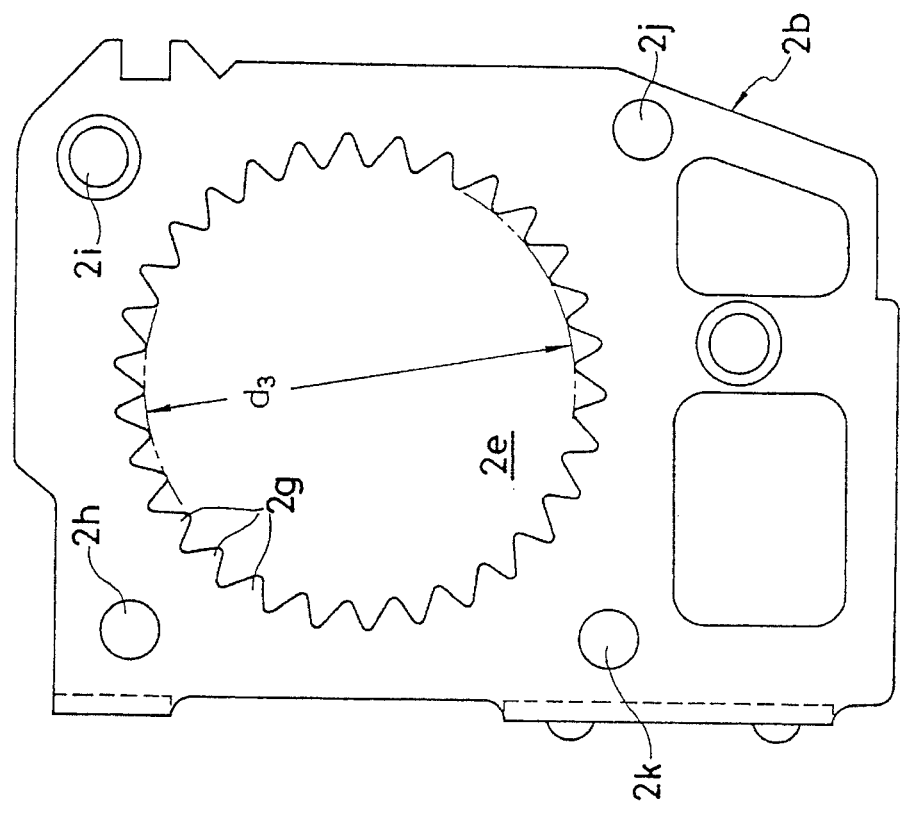
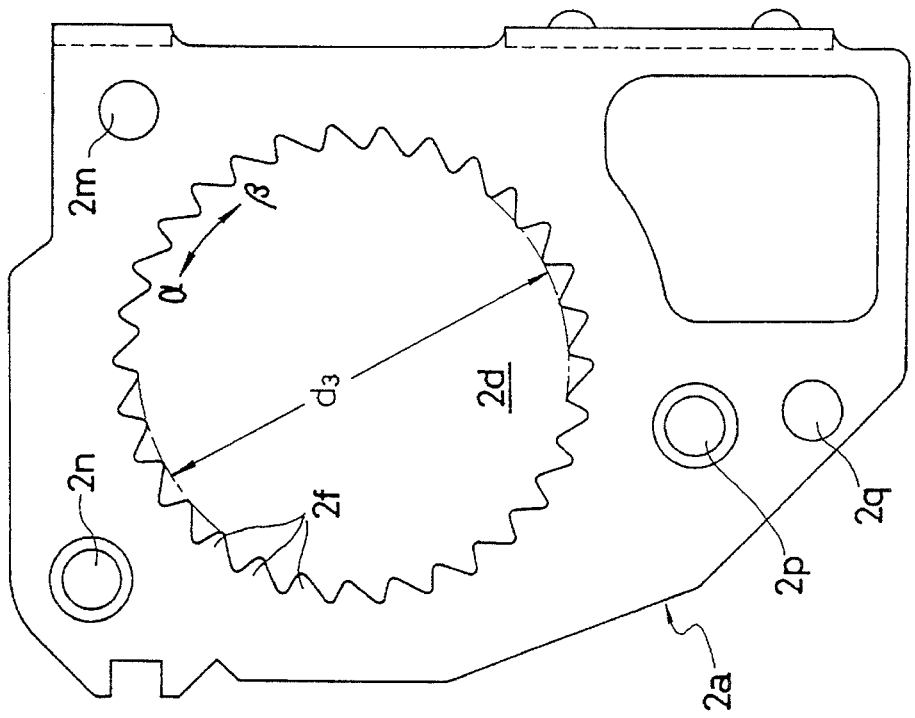
FIG. 5

FIG. 7
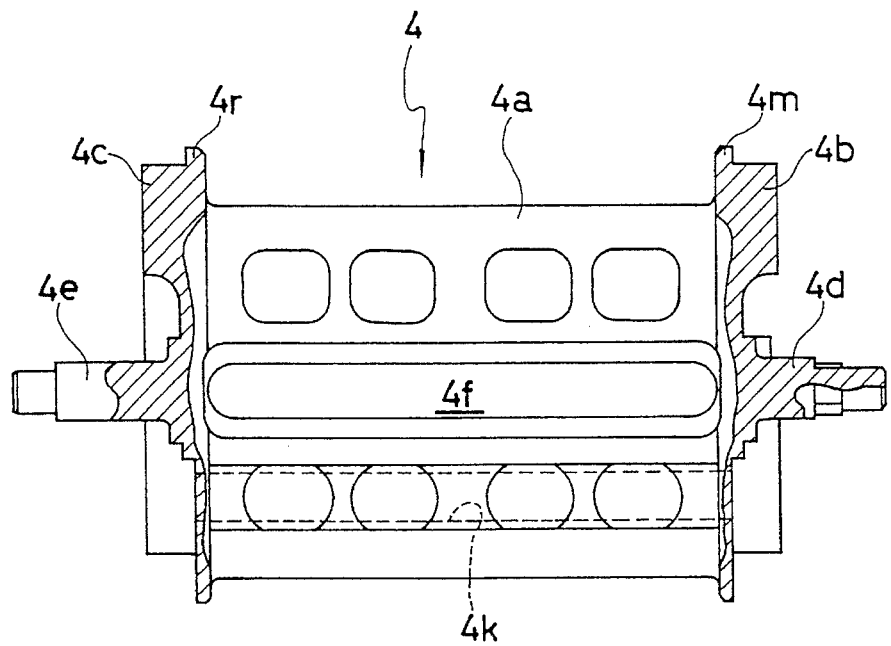
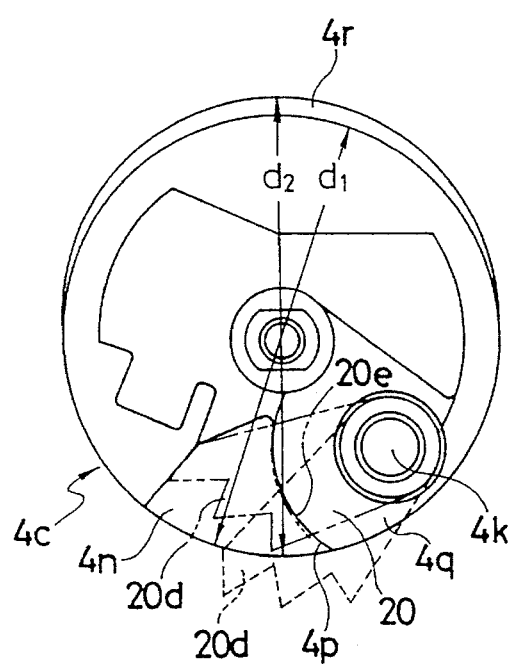
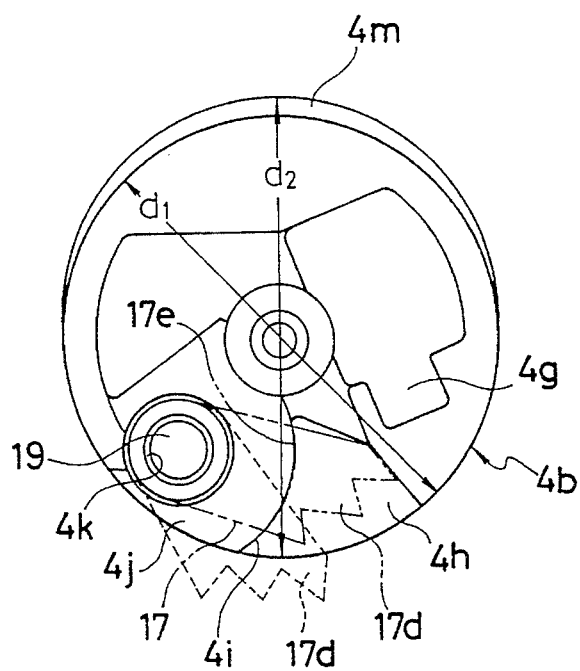
Fig. 8(b)                    Fig. 8(a)

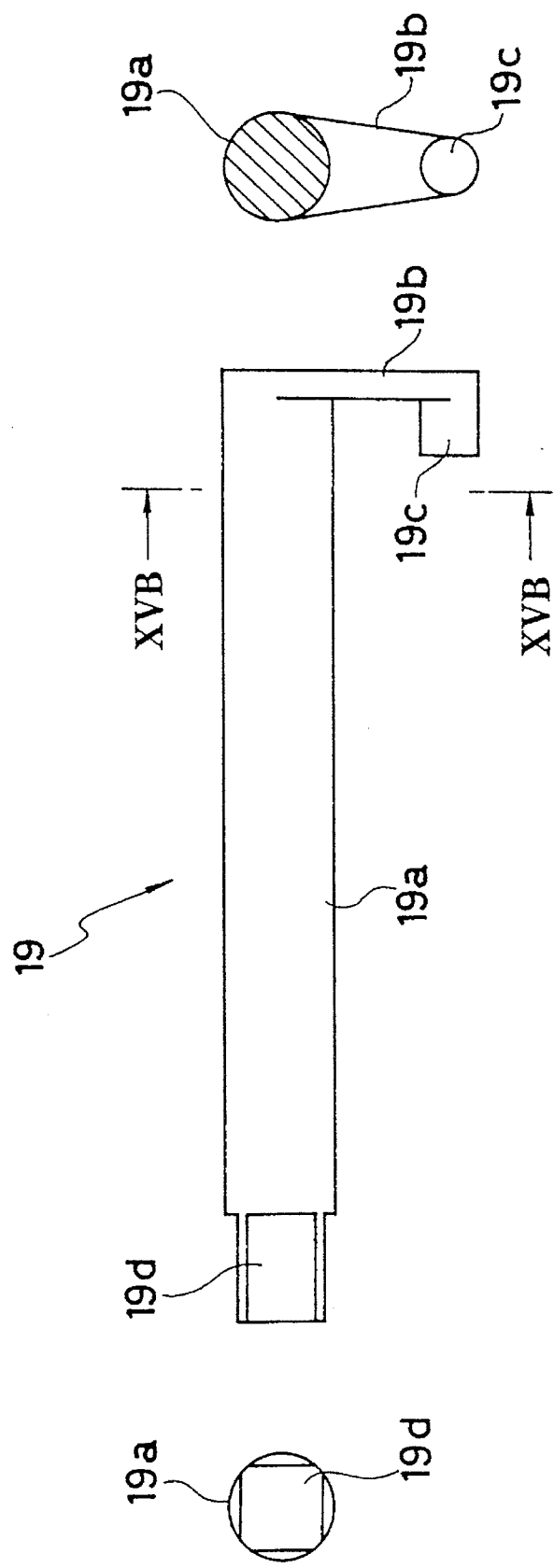

SEAT BELT RETRACTOR

BACKGROUND OF THE INVENTION

The present invention relates to a seat belt device that is provided on a vehicle, for example, an automobile, for the purpose of protecting an occupant. More particularly, the present invention relates to a seat belt retractor locking the reel shaft from rotating to prevent the webbing from being pulled out when an emergency situation occurs.

Conventional seat belt retractors are provided on automobiles and other vehicles. One of the conventional seat belt retractors has a reel shaft for winding up a webbing and prevents the reel shaft from rotating in an unwinding direction by a frame thereof when it is desired. The seat belt retractor is a frame locking type as disclosed in Japenese Published Unexamined Patent Application No. H5 (1993)-193441.

FIG. 19 is a sectional view of the seat belt retractor. FIG. 20 is a sectional view taken along a line XX—XX of FIG. 19. In these figures, the numeral 101 is a seat belt retractor, the numeral 102 is a U-shaped frame, the numeral 102a is a left-hand side wall, the numeral 102b is a right-hand side wall, the numeral 102c is teeth, the numeral 103 is a reel shaft, the numeral 104 is a webbing, the numeral 105 is a lock gear, the numeral 105a is external teeth, the numerals 105b, 105c are cam holes, the numeral 106 is a main pawl, the numeral 107 is a backup pawl, the numeral 108 is a joint pin, the numeral 109 is an inertia member, the numeral 109a is a pawl, the numeral 110 is a cover, the numeral 110a is inner teeth, the numeral 111 is deceleration sensing means, the numeral 111a is an inertia ball, the numeral 111b is a lever, the numeral 111c is a pawl, and the numeral 112 is biasing force application means.

When a predetermined degree of deceleration acts on the vehicle, an inertia ball 111a moves and lever 111b pivots to the position as shown by the two-dot chin line. Since the webbing 104 is unwound due to the deceleration, the reel shaft 103 and lock gear 105 thereby rotate in a webbing unwinding direction α. The external teeth 105a engage with the pawl 111c of the lever 111b to stop the lock gear 105 so that only the reel shaft 103 rotates. The main pawl 106 moves along the cam hole 103b, then engages with the teeth 102c of the left-hand side wall 102a. At the same time, the joint pin 108 rotates along the cam hole 105c so that the backup pawl 107 rotates to engage with the teeth 102d of the right-hand side wall 102b. Thereby, the reel shaft 103 stops rotating and the webbing 104 is prevented from being unwound.

On the other hand, as the webbing 104 is unwound rapidly, the reel shaft 103 and the lock gear 105 rapidly rotate in the webbing unwinding direction a, while the inertia member 109 is positioned as shown by the two-dot chain line because of the inertia delay. In this state, the reel shaft 103 and the lock gear 105 rotate in the direction α so that the pawl 109a of the inertia member 109 engages with the teeth 110a. The lock gear 105 then stops and only the reel shaft 103 rotates. Therefore, the main pawl 106 engages with the teeth 102c, the backup pawl 107 engages with the teeth 102d and the reel shaft 103 stops rotating so that the webbing 104 is prevented from being unwound as described above.

In the conventional seat belt retractor 101, the number of the teeth 102c, 102d formed on the frame 102 is relatively great and the number of the inner teeth 110a of the cover 110 is the same so as to restrain the amount of the webbing 104 in the unwound direction as little as possible during the deceleration or when the webbing 104 is unwound rapidly.

However, in the conventional seat belt retractor, when the webbing 104 is unwound to the end against the biasing force of the biasing force application means 112, the inertia member 109 pivots to the position as shown by the two-dot chain line by its inertia so as to engage with the teeth 110a. This tends to occur the problem known as an "end lock", that is, to prevent the webbing from being wound.

SUMMARY OF THE INVENTION

It is an object of the present invention to provide a seat belt retractor which can greatly restrain the end lock from occurring.

For accomplishing the above mentioned object, the present invention provides a seat belt retractor comprising a real shaft for a webbing winding, a frame for rotatably supporting both ends of said reel shaft, locking means for preventing said reel shaft from rotating in a webbing unwinding direction at a time when it is necessary to prevent said reel shaft from rotating, activating locking means or device for activating said locking means, said locking means having reel shaft-rotating preventing teeth which are provided on said frame, and a pawl engaging with said reel shaft-rotating preventing teeth at said time so as to prevent said reel shaft from rotating in the webbing unwinding direction, said activating locking means having a lock gear for engaging said pawl with said reel shaft-rotating preventing teeth, and a predetermined number of lock gear-rotating preventing teeth, and an inertia member having a pawl for engaging with said lock gear-rotating preventing teeth; and the number of said lock gear-rotating preventing teeth is set to be less than the number of said reel shaft-rotating preventing teeth.

Further, according to the present invention, the lock gear is disposed on said reel shaft to rotate coaxially with and relative to said reel shaft and for engaging said pawl for said locking means with said reel shaft-rotating preventing teeth during the relative rotation of said reel shaft, and said lock gear-rotating preventing teeth are provided on said frame in an annular shape and concentrical relation with said lock gear.

Furthermore, according to the present invention, the number of said lock gear-rotating preventing teeth is set to be a common divisor of the number of said reel shaft-rotating preventing teeth.

Furthermore, according to the present invention, the lock gear-rotating preventing teeth are set to have the same positional relation with said reel shaft-rotating preventing teeth.

Furthermore, according to the present invention, the lock gear-rotating preventing teeth are disposed in an annular shape at equal pitches.

Furthermore, according to the present invention, the inertia member is disposed rockably on said lock gear.

Furthermore, the present invention, includes a deceleration sensing means which works when deceleration exceeding a predetermined value acts on the vehicle, and a webbing-unwinding sensing means which works when the webbing is unwound in excess of a predetermined speed, and activating locking means activates said locking means in accordance with the working of said deceleration sensing means or said webbing unwinding sensing means.

In the seat belt retractor structured as described above, the number of the lock gear-rotating preventing teeth is set to be less than the number of the reel shaft-rotating preventing teeth so as to decrease the frequency of occurrences of the end lock. In this case, the decreasing rate of the frequency of occurrences of the end lock is larger than the decreasing rate of the number of the teeth so as to greatly restrain the end lock from occurring.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1A is an exploded perspective view of a left-hand portion of one embodiment of a seat belt retractor according to the present invention;

FIG. 5 is a side view of a frame employed in the embodiment, as seen from the right-hand side thereof;

FIG. 6 is a side view of the frame employed in the embodiment, as seem from the left-hand side thereof;

FIG. 7 is a front view of a reel shaft employed in the embodiment;

FIG. 8($a$) is a side view of the reel shaft as seem from the right-hand side thereof and FIG. 8($b$) is a side view of the reel shaft as seen from the left-hand thereof;

FIG. 15($a$) is a front view of a joint pin, FIG. 15($b$) is a sectional view taken along the line XVB—XVB in FIG. 15($a$), and FIG. 15($c$) is a side view of the joint pin as seen from the left side thereof;

FIGS. 18($a$)'–18($h$)' illustrate an operation of the backup pawl in the embodiment;

DESCRIPTION OF THE PREFERRED EMBODIMENTS

As shown in FIGS. 1A to 4, the seat belt retractor 1 in this embodiment includes a U-shaped frame 2 having a pair of right-hand and left-hand side walls 2$a$ and 2$b$, which are connected together through a connecting member 2$c$, thereby reinforcing the frame 2. The right-hand side wall 2$a$ is formed with a circular hole 2$d$, as shown in FIG. 5. Similarly, the left-hand side wall 2$b$ is formed with a circular hole 2$e$, as shown in FIG. 6. In addition, the inner peripheral surfaces of the hole 2$d$ and 2$e$ in the right-hand and left hand side walls 2$a$ and 2$b$ are formed with a predetermined number (thirty in the figure) of sawtooth-shaped teeth 2$f$, . . . and 2$g$, . . . over the entire circumferences thereof, respectively. The teeth 2$f$ and 2$g$ have the same triangular cross-sectional configurations. The surface of each tooth that faces the webbing unwinding direction α has a relatively steep slope, whereas the surface of the tooth that faces a webbing winding direction B has a relatively gentle slope. The phase of the left-hand teeth 2$g$ is advanced at a predetermined angle (e.g., 3°) in a webbing unwinding direction α with respect to the phase of the right-hand teeth 2$f$. The teeth 2$f$ and 2$g$ are provided for preventing a reel shaft from rotating in the present invention.

Figure 3:
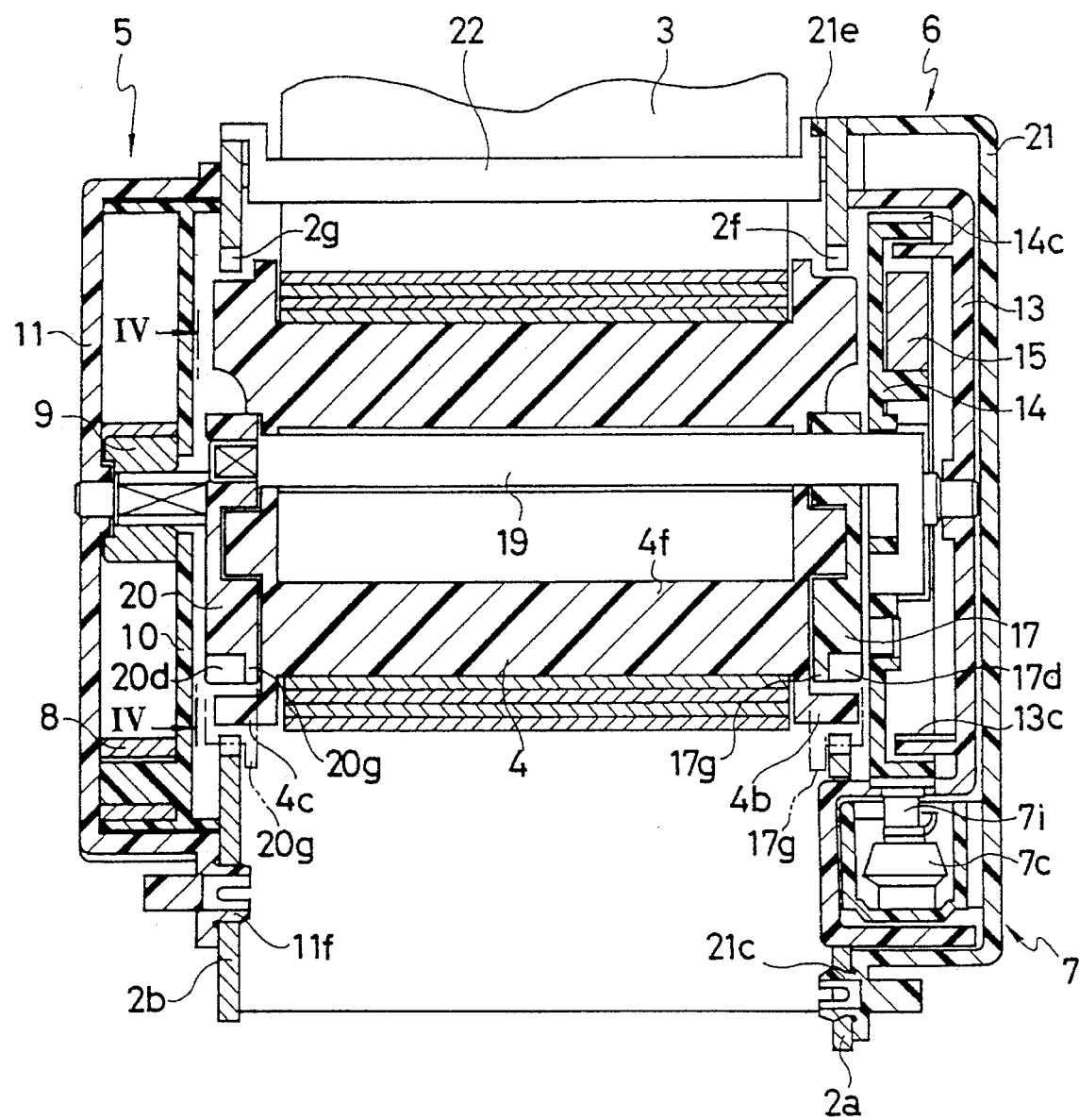
FIG. 3 is a sectional view taken along the line III—III in FIG. 2, showing the assembled state of the seat belt retractor of the embodiment.

As shown in FIG. 3, a reel shaft 4 for winding up a webbing 3 is disposed between the right-hand and left-hand side walls 2$a$ and 2$b$ of the frame 2. Referring to FIG. 7, the reel shaft 4 comprises a central webbing winding portion 4$a$, circular guide flanges 4$b$ and 4$c$, which are formed at the right and left ends, respectively, of the webbing winding portion 4$a$ so as to guide the webbing 3 when wound up and off, a first rotating shaft 4$d$ which is provided in the center of the guide flange 4$b$ so as to project axially outwardly, and a second rotating shaft 4$e$ which is provided in the center of the guide flange 4$c$ in concentrial relation to the first rotating shaft 4$d$. The first rotating shaft 4$d$ and the second rotating shaft 4$e$ rotating coaxially with the first rotating shaft 4$d$ are positioned along a central axis of the webbing winding portion 4$a$. The webbing winding portion 4$a$ is provided with a diametrical through-hole 4$f$ into which one end of the webbing 3 is inserted and retained so that the webbing 3 can be wound up.

As shown in FIG. 8($a$), the right-hand guide flange 4$b$ is formed in a circular shape having a diameter d1 and is provided with a first recess 4$g$ for accommodating a pawl spring 18 (shown in FIG. 1B), a second recess 4$h$ in which is disposed a pawl portion 17$c$ of a main pawl 17 (shown specifically in FIGS. 14($a$)–(14($c$), described later), a load bearing portion 4$j$ that is formed with a load beating surface 4$i$ for receiving a load applied to the pawl portion 17$c$ of the main pawl 17, an axial through-hole 4$k$ in which a joint pin 19 (shown specifically in FIG. 15, described later) is rotatably fitted. The load bearing surface 4$i$ is formed in a circular-arc shape which has a predetermined length and is in concentrical relation with the through-hole 4$k$.

In addition, the guide flange 4$b$ is provided with an arcuate fall preventing flange 4$m$, which is disposed on the outer peripheral surface thereof, for preventing the reel shaft from coming off the hole 2$d$ of the right-hand side wall 2$a$ when the webbing winding portion 4$a$ of the reel shaft 4 is disposed at a predetermined position between the right-hand side wall 2a and the left-hand side wall 2b. The fall preventing flange 4m is set to have the substantially same diameter as the outer diameter of the guide flange 4b and is eccentrically disposed to project a predetermined amount from the periphery of the guide flange 4b roughly opposite to the through-hole 4k. The diameter d2 is the maximum diameter of the periphery formed with the guide flange 4b and the fall preventing flange 4m is slightly smaller a than the inner diameter d3 (as shown in FIGS. 5 and 6) of the distal ends of the teeth 2f and 2g formed on the inner surface of the holes 2d and 2e of the right-hand and left-hand side walls. That is, the guide flange 4b including the fall preventing flange 4m can be passed through the through holes 2d and 2e.

Figures 14A, 14B, 14C, 16A, 16B, 16C:
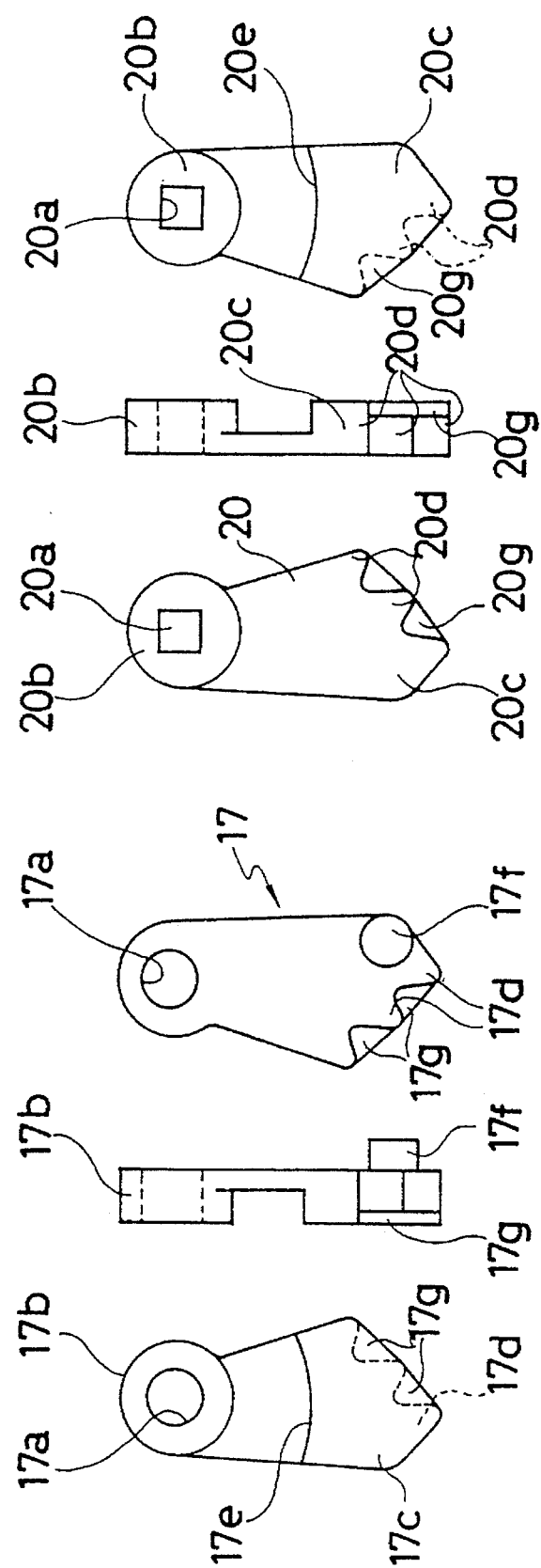
FIG. 14($a$) is a side view of a main pawl as seen from the left-hand side thereof, FIG. 14($b$) is a front view of the main pawl, and FIG. 14($c$) is a side view of the main pawl as seen from the right-hand side thereof.
FIG. 16($a$) is a side view of a backup pawl as seen from the left-hand side thereof, FIG. 16($b$) is a front view of the backup pawl, and FIG. 16($c$) is a side view of the backup pawl as seen from the right-hand side thereof.

In addition, as shown in FIG. 8(b), the left-hand guide flange 4c is provided with a third recess 4n in which is disposed a pawl portion 20c of a backup pawl 20 (shown specifically in FIGS. 16(a)–16(c), described later), a load bearing portion 4q that is formed with a load bearing surface 4p for receiving a load applied to the pawl portion 20c of the backup pawl 20, an axial through-hole 4k in which the joint pin 19 is rotatably fitted. The load bearing surface 4p is formed in a circular-arc shape which has a predetermined length and is in concentrical relation with the through-hole 4k.

In addition, the guide flange 4c is provided with a fall preventing flange 4r, which is disposed on the outer peripheral surface thereof, for preventing the reel shaft from coming off from the hole 2e of the left-hand side wall 2b when the webbing winding portion 4a of the reel shaft 4 is disposed at the predetermined position between the right-hand side wall 2a and the left-hand side wall 2b. The fall preventing flange 4r is formed to be the same size as the size of the fall preventing flange 4m.

As apparent from FIG. 7, the through-hole 4k extends not only through the guide flanges 4b and 4c but also through the central webbing winding portion 4a axially. In other words, the through-hole 4k extends axially through the reel shaft 4.

Figure 1B:
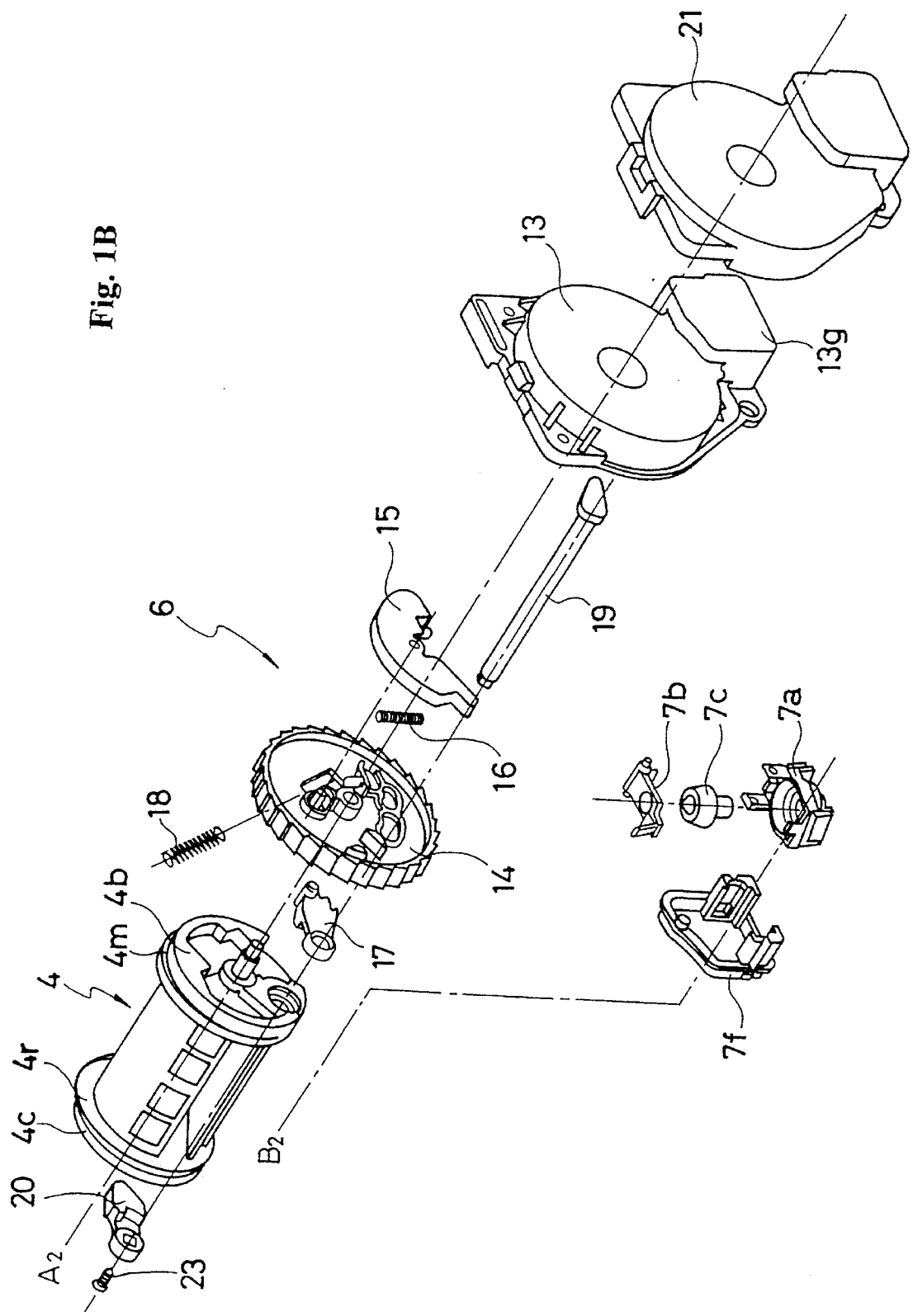
FIG. 1B is an exploded perspective view of a right-hand portion of the embodiment shown in FIG. 1A.
Figure 2:
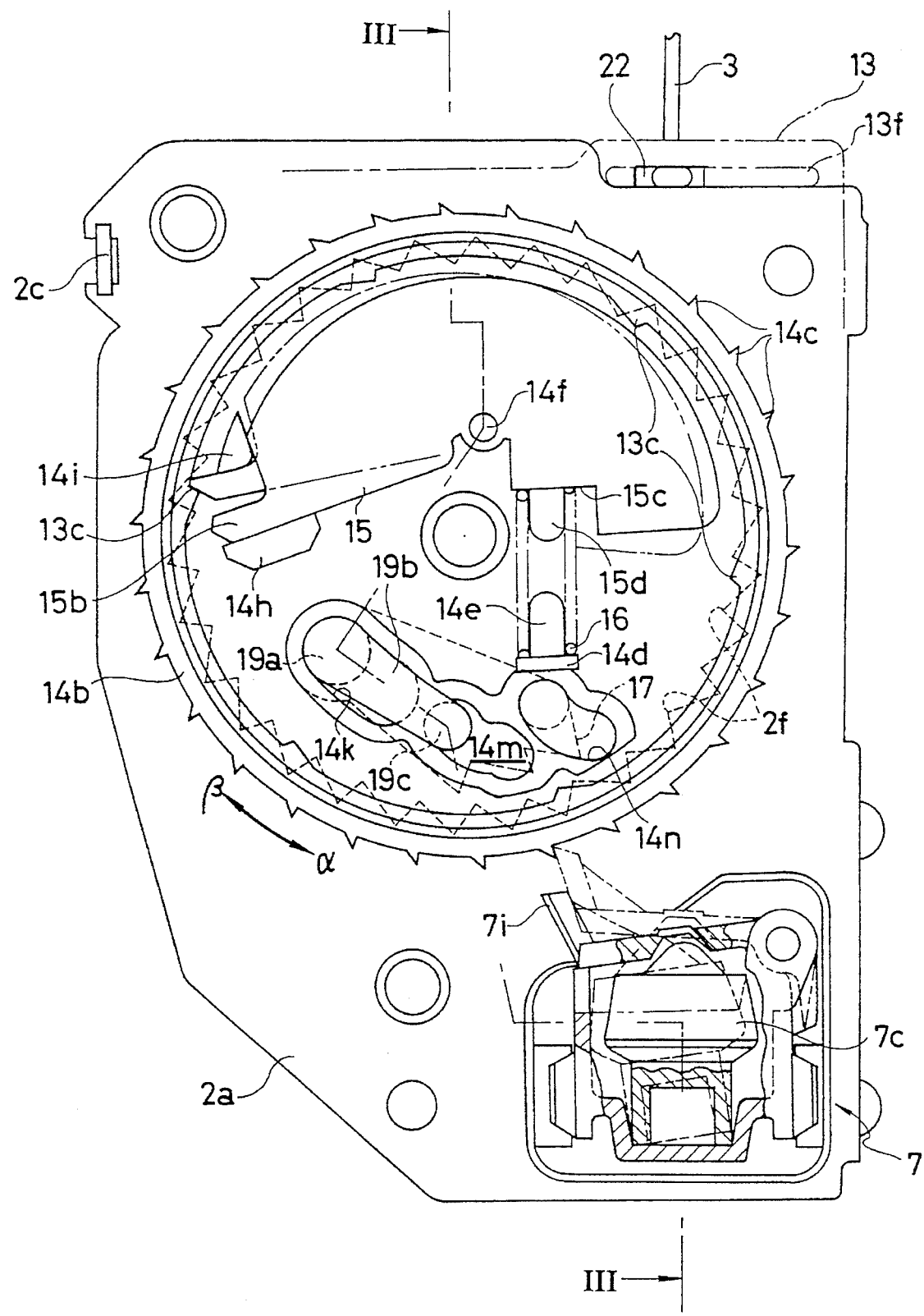
FIG. 2 is a side view of the seat belt retractor of the embodiment in an assembled state, as seen from the left-hand side thereof, with a cover removed therefrom.

As shown in FIGS. 1A and 3, the left-hand side wall 2b has a biasing force application means 5 attached thereto for giving the reel shaft 4 force for winding up the webbing 3. Further, a seat belt lock activating means 6 is attached to the right-hand side wall 2a, as shown in FIGS. 1B, 2 and 3. In addition, the right-hand side wall 2a is provided with a deceleration sensing means 7, as shown in FIGS. 2 and 3. When a predetermined degree of deceleration acts on the vehicle, the deceleration sensing means 7 senses the deceleration and activates the seat belt lock activating means 6. As apparent from FIG. 1A, the biasing force application means 5 comprises a power spring 8, which is a spiral spring, a bush 9 to which the inner end 8a of the power spring 8 is connected to apply spring force thereto, a spring casing 10 to which the outer end 8b of the power spring 8 is secured and which accommodates the power spring 8, a cover 11 which is attached to the spring casing 10 to cover the power spring 8, and a cap 12 for sealing a hole for a spring stopper.

The bush 9 is connected to the second rotating shaft 4e so as to be unable to rotate relative to it, thereby allowing the spring force of the spring 8 to act on the reel shaft 4 through the bush 9 in the webbing winding direction B at all times.

On the other hand, as apparent from FIG. 1B, the seat belt lock activating means 6 comprises a lock gear first cover 13 fixed to the right-hand side wall 2a of the frame 2, a lock gear 14, an inertia member 15 rockably mounted to the lock gear 14, a control spring 16 disposed between the lock gear 14 and the inertia member 15, a main pawl 17 forming a stopping member which has an end rotatably connected to and supported by the joint pin 19 passed through the through-hole 4k and the other end positioned at the second recess 4h and mounted on the right-hand guide flange 4b, a pawl spring 18 accommodated in the first recess 4g of the reel shaft 4 and compressedly disposed between the reel shaft and the main pawl 17, a joint pin 19 passing through the axial through-hole 4k of the reel shaft 4, a back-up pawl 20 having an end which is connected to the end of the joint pin 19 so as to be unable to rotate relative to it and the other end which is positioned at the third recess 4n and mounted on the left-hand guide flange 4c to form a stopping portion, a lock gear second cover 21 which is connected to and supported by the right-hand side wall 2a of the frame 2 to cover the lock gear first cover 13, the lock gear 14, the inertia member 15, the main pawl 17, the joint pin 19, and the deceleration sensing means 7.

As shown in FIG. 1A, the seat belt retractor 1 comprises a webbing guide 22 which moves corresponding to the unwinding or winding amount of the webbing to guide the webbing 3.

Figure 9:
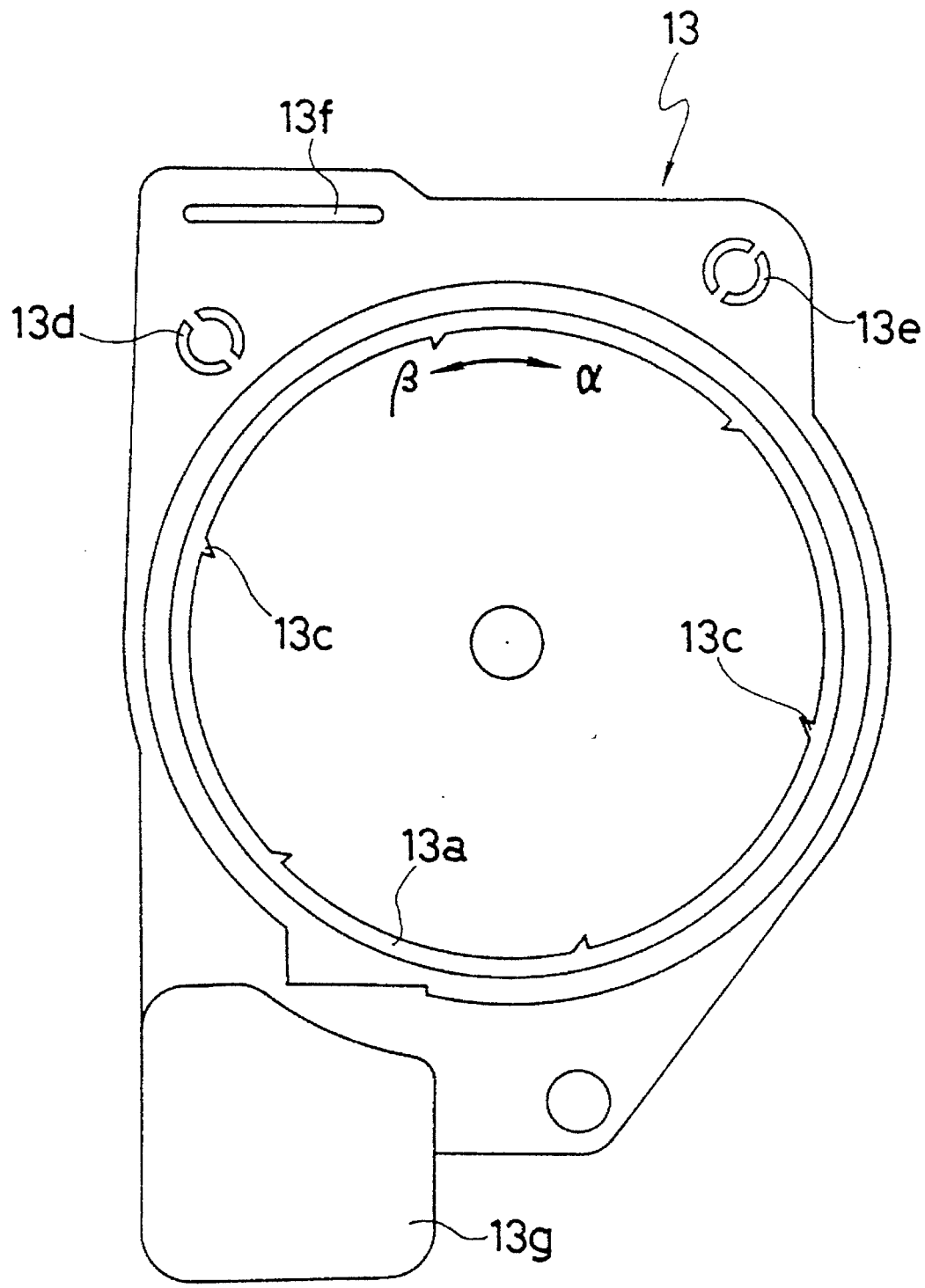
FIG. 9 is a side view of a lock gear first cover employed in the embodiment, as seen from the left-hand side thereof.

As shown in FIG. 9, the lock gear first cover 13 has a projection 13a formed in a relatively large ring shape. The projection 13a has a predetermined number (six in the figure) of teeth 13c, 13c, for stopping the rotation of the lock gear, formed all around the inner surface of the projection 13a at the same intervals. When the lock gear first cover 13 is fixed to the right-hand side wall 2a, these teeth 13c, 13c, ... are formed to have the same positional relation with the teeth 2f, 2f, ... formed on the right-hand side wall 2a. Further the number of the teeth 13c is set to be a common divisor of the number of the teeth 2f (in the figure, the number of the teeth 13c is six while the number of the teeth 2f is thirty).

The reason that the number of the teeth is set to be six not thirty, the same number of the teeth 2f, will be described now. As a result of various examinations for examining a factor of the end lock, the inventor of this invention thought that the frequency of occurrence of the end lock has varied by the relative position between the teeth 13c of the lock gear first cover 13 and a pawl 15b of the inertia member 15. Since the number of the teeth formed on the frame is thirty in this embodiment, the inventor made a test piece in which the number of the teeth 13c of the cover is set to be six which is a common divisor of the number of the teeth of the frame and set to be at equal pitches (that is, 60° pitch) and then examined the various tests using the test piece. The result of these tests is shown in Table 1 and FIG. 10.

TABLE 1

| | Number of Teeth of Lock gear first cover 13 | |
| --- | --- | --- |
| | 6 | 30 |
| No. 1 | 0/50 | 33/50 |
| No. 2 | 3/50 | 19/50 |
| No. 3 | 0/50 | 33/50 |
| No. 4 | 7/50 | 27/50 |

The number of occurrences of end lock/the number of tests

Figure 10:
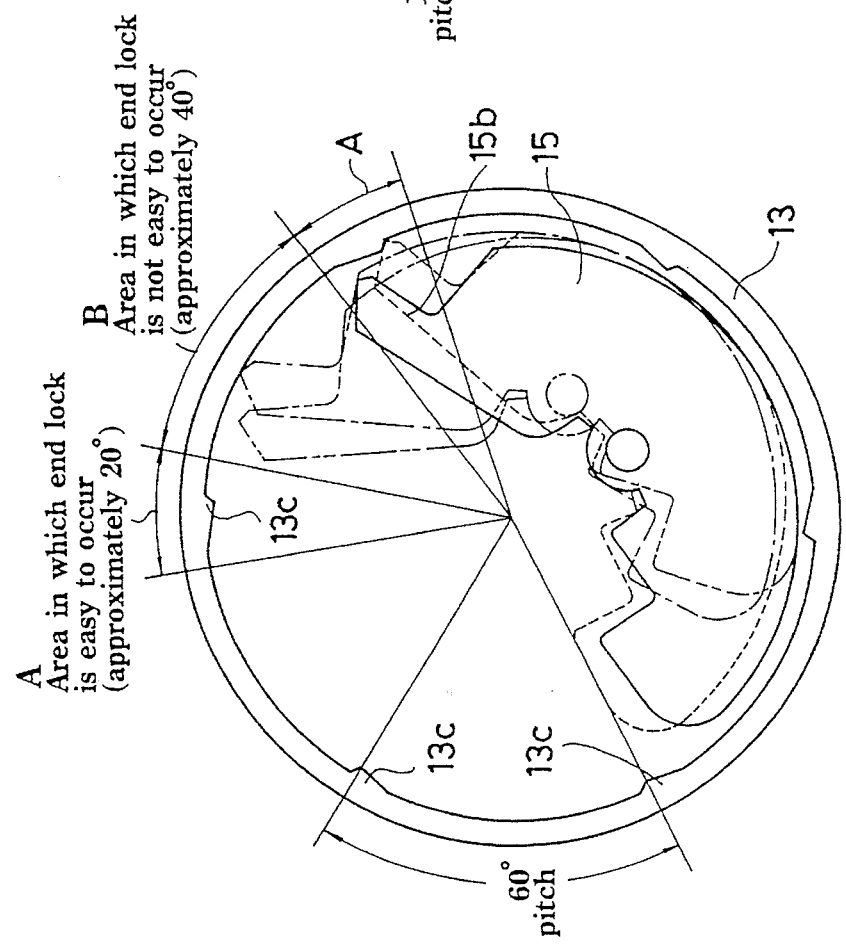
FIG. 10 is an explanatory view of a relation between teeth of the lock gear and an inertia member employed in the embodiment.

In Table 1, each of No. 1~3 is a case that the pawl 15b of the inertia member 15 is set in an area B that is within approximately 40° except an area A that is within approximately 20° including the tooth 13c as a center of the area A as shown in FIG. 10. No. 4 is a case that the pawl 15b of the inertia member 15 is set in the area A. For comparing, the inventor also made a test piece in which the number of the teeth 13c of the cover is set to be thirty which is the same number of the teeth of the frame and examined the exactly same tests using the test piece.

Figure 11:
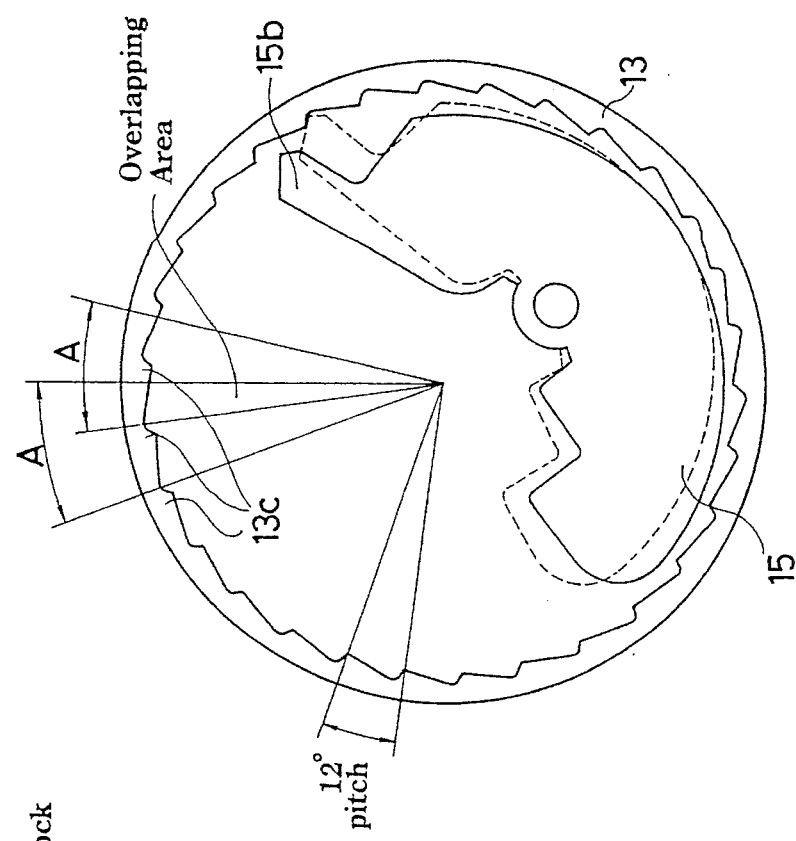
FIG. 11 is a view in use of explaining a test piece for comparing with the embodiment.

The result of the tests is shown in Table 1 and FIG. 11. As apparent from Table 1 and FIG. 10, in case that the number of the teeth 13c is six, the end lock is easy to occur when the pawl 15b of the inertia member 15 is positioned (as illustrated by the solid line and the dotted line) in the area A that is within approximately 20° from the tooth 13c, and the end lock does not easily occur when the pawl 15b of the inertia member 15 is set in the area B that is within approximately 40° except the area A. The reason why the end lock does not easily occur is considered that there is not the tooth 13c in the area B and the area B is apart from the tooth 13c.

On the other hand, in case that the number of teeth 13c is thirty, as apparent from Table 1, the end lock is easy to occur even if a position of the pawl 15b of the inertia member 15 relative to the teeth 13c is at any place. The reason why the end lock is easy to occur is considered that the teeth 13 are set at 12° pitches and the area B does not exist because the area A is overlapped by the area A of the next tooth 13c as apparent from FIG. 11.

Reviewing Table 1 from another view point, as the number of the teeth 13c is reduced from thirty to six, that is, the number of the teeth 13c is reduced to be one fifth, the frequency of occurrence of the end lock decreases to be trader one fifth. Particularly, as the pawl 15b of the inertia member 15 is positioned in the area B, the frequency of occurrence of the end lock decreases to be under one tenth.

In this embodiment, the number of the teeth 13c is set to be six corresponding to the number of the teeth 2f which is thirty so as to greatly restrain the end lock from occurring. The number of the teeth 13c is not necessary to be a common divisor of the number of the teeth 2f of the frame and may be set to be any number under eighteen which is less than the number of the teeth 2f. In addition, the teeth 13c are not necessary to be disposed at equal pitches in the peripheral direction and may be disposed at unequal pitches. However, the number of the teeth 13c is preferably a common divisor of the number of the teeth 2f and the teeth 13c are preferably disposed at equal pitches in the peripheral direction.

Each tooth 13c has the triangular cross-sectional configuration. The surface of each tooth that faces the webbing unwinding direction α has a relatively steep slope, whereas the surface of the tooth that faces a webbing winding direction b has a relatively gentle slope. A horizontal elongated guide hole 13f is formed on the upper portion of the lock gear first cover 13.

Further, an accommodation unit 13g of the deceleration sensing means 7 is disposed on the lower portion of the lock gear first cover 13 to open the surface opposite to the surface shown in the figure. The deceleration sensing means 7 is accommodated and fixed in the accommodation unit 13g.

Figure 12:
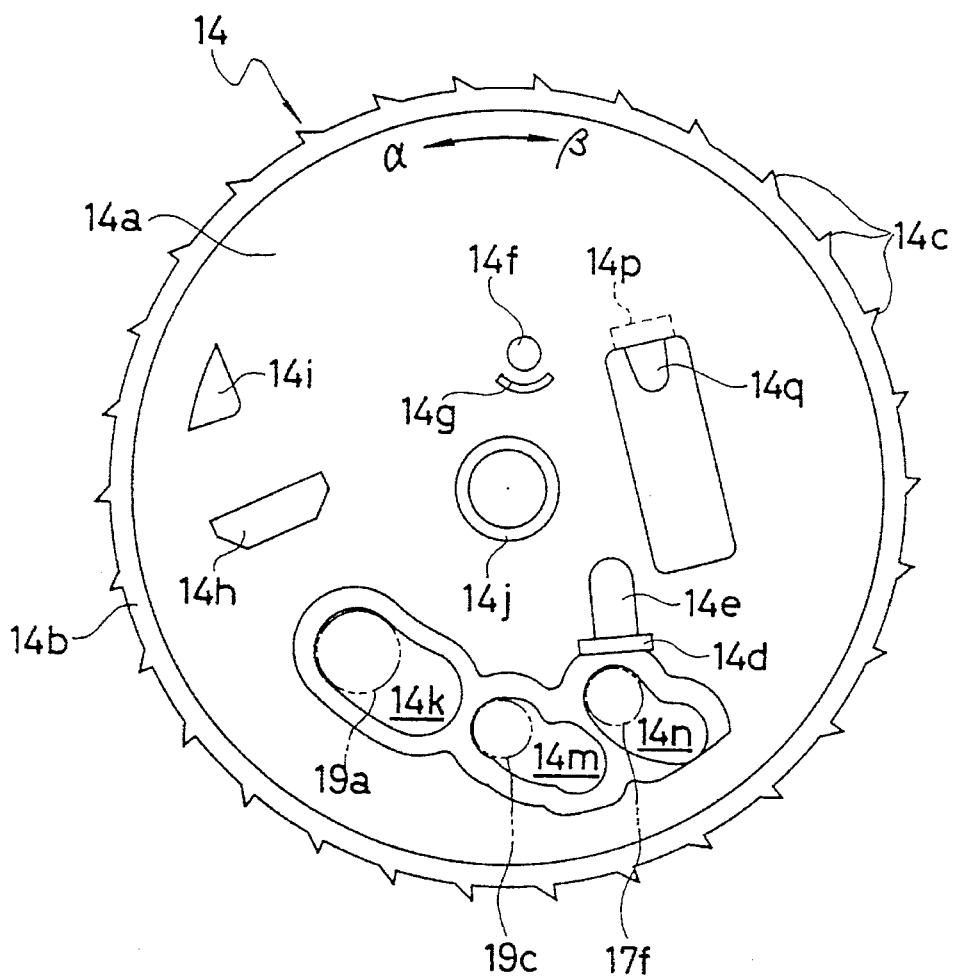
FIG. 12 is a view showing the lock gear employed in the embodiment.

As shown in FIG. 12, the lock gear 14 comprises a circular flat plate portion 14a, and an annular flange 14b that is formed around the outer peripheral edge of the flat plate portion 14a. The outer peripheral surface of the flange 14b is formed with a predetermined number of teeth 14c. Each tooth 14c has a triangular cross-sectional configuration in which the surface of the tooth 14c which faces the webbing unwinding direction α is a relatively gentle slope, whereas, the surface thereof which faces the webbing winding direction B is a substantially vertical surface.

The flat plate portion 14a has a spring retaining member 14d, for supporting one end of the control spring 16, provided on a surface opposite to a surface facing the right-hand guide flange 4b. The spring retaining member 14d is provided with a spring guide portion 14e that projects parallel to the flat plate portion 14a. Further, the flat plate portion 14a is provided with a shaft 14f for rockably supporting the inertia member 15, as described later. An arcuate fall preventing member 14g is provided adjacent to the shaft 14f. When the inertia member 15 engages with the shaft 14f, the inertia member 15 normally does not come off the shaft 14f and is rockably supported by the shaft 14f. When a slight external force is applied to the inertia member 15 in a direction in which it comes off the shaft 4f, the inertia member 15 is readily comes off the shaft 14f. In addition, the flat plate portion 14a is provided with a first stopper 14h and a second stopper 14i and further has a tubular rotating shaft 14j axially projecting from the center of the flat plate portion 14a. It should be noted that the bore of the tubular rotating shaft 4 is pierced to receive with the first rotating shaft 4d of the reel shaft 4 so that the rotating shaft 14j is rotatable about the first rotating shaft 4d.

Further, the flat plate portion 14a is provided with first, second and third cam holes 14k, 14m, and 14n, which pierce the flat plate portion 14a and have predetermined configurations. The first cam hole 14k is formed as a circular arc relative to the rotating shaft 14j.

On the right-hand side surface (the surface that is not surrounded with the flange 14b) of the flat plate portion 14a is provided with a spring retaining member 14p for supporting one end of the pawl spring 18. The spring retaining member 14p is provided with a spring guide portion 14q which projects parallel to the flat plate portion 14a.

Figure 13:
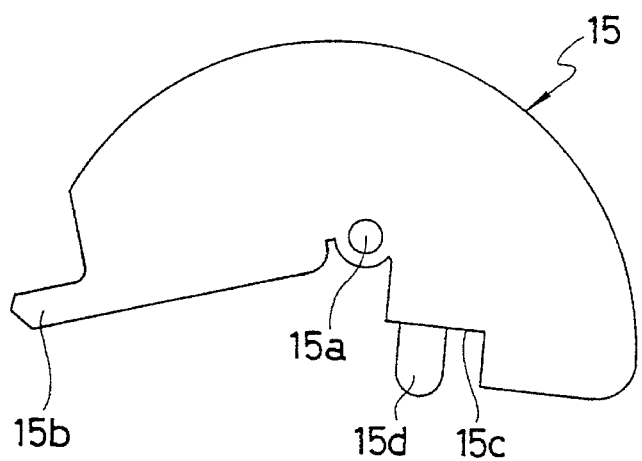
FIG. 13 is a view showing the inertia member employed in the embodiment.

As shown in FIG. 13, the inertia member 15 is formed in an approximately semicircle shape from a flat plate. The inertia member 15 is formed with a hole 15a in the center thereof. Further, the inertia member 15 is formed with the pawl 15b in one end thereof and is provided with a spring retaining member 15c, for supporting and guiding the other end of the control spring 16, and a spring guide portion 15d in the other end thereof. As shown in FIG. 2, the inertia member 15 is rockably supported on the lock gear 14 by fitting the hole 15a with the shaft 14f of the lock gear 14.

As shown in FIG. 2, the control spring 16 is fitted at both ends thereof to the respective guide portions 14e and 15d of the lock gear 14 to place the inertia member 15 in a state where the inertia member 15 is rockably supported on the shaft 14f. The control spring 16 is thus compressedly disposed between the spring retaining members 14d and 15c. Accordingly, the inertia member 15 is constantly biased in the webbing unwinding direction α relative to the lock gear 14 by the spring force from the control spring 16, so that it is normally held in a position where it abuts on the first stopper 14h, as shown by the solid line. When the inertia member 15 rotates in the webbing winding direction B relative to the lock gear 14 against the spring force of the control spring 16, the inertia member 15 assumes a position where it abuts on the second stopper 14i, as shown by the two-dot chain line.

As shown in FIG. 2 and FIG. 3, when the seat belt retractor 1 is in an assembled state, the teeth 13c of the lock gear first cover 13 lie inside the annular flange 14b of the lock gear 14 and is positioned between the flange 14b and the inertia member 15. Since the inertia member 15 is normally held in a position where it abuts on the first stopper 14h, which is shown by the solid line in FIG. 2, the pawl 15b is held in a non-engaging position, which is apart from the teeth 13c. When the inertia member 15 is in a position where it abuts on the second stopper 14i, which is shown by the two-dot chain line in FIG. 2, the pawl 15b assumes a position where it is engageable with a tooth 13c.

If the lock gear 14 rotates in the webbing unwinding direction α when the pawl 15b is in the engageable position, the pawl 15b engages with a tooth 13c, so that the lock gear 14 is prevented from further rotating in the webbing unwinding direction α. If the lock gear 14 rotates in the webbing winding direction B when the pawl 15b is in the engageable position, the pawl 15b passes over the teeth 13c while moving along the gentle slopes of the teeth 13c against the control spring 16. Accordingly, the lock gear 14 is rotatable in the webbing winding direction B.

As shown FIG. 14, the main pawl 17 is formed in a substantially fan-like shape and has a boss portion 17b formed in a portion which serves as a pivot. The boss portion 17b has a through-hole 17a. The main pawl 17 has a pawl portion 17c formed on an end at an opposite side to the portion which serves as a pivot. In addition, teeth 17d which are engageable with the teeth 2f of the right-hand side wall 2a of the frame 2 are formed at the distal end of the pawl portion 17c.

As shown in FIG. 8(a), the boss portion 17b is fitted with the joint pin 19 which pierces the through-hole 14k and the main pawl 17 is disposed to be rockable between a non-engaging position as shown by the two-dot chain line and the engaging position as shown by the dotted line. At the non-engaging position of the main pawl 17, the teeth 17d formed at the distal end thereof is positioned entirely inside from the outer peripheral surface of the guide flange 4b to reach a position where it does not engage with the teeth 2f of the right-hand side wall 2a of the frame 2. At the engaging position of the main pawl 17, the teeth 17d project outwardly from the outer peripheral surface of the guide flange 4b to reach a position where it engages with the teeth 2f.

In addition, the main pawl 17 has a load transfer portion 17e formed at an end opposite to the teeth 17d of the pawl portion 17c. The load transfer portion 17e is formed from a circular arc which is a part of a circle concentrical with respect to the through-hole 17a and the boss portion 17b. When the main pawl 17 is attached to the right-hand guide flange 4b, the load transfer portion 17e abuts on the load bearing surface 4i of the right-hand guide flange 4b. Since the load transfer portion 17e and the load bearing surface 4i of the reel shaft 4 are formed from circular arcs of the same circle, the load transfer portion 17e abuts on the load bearing surface 4i of the reel shaft 4 at all times irrespective of the position of the main pawl 17. Thus, since the load transfer portion 17e abuts on the load bearing surface 4i of the reel shaft 4, a load applied to the pawl portion 17c of the main pawl 17 is transferred from the load transfer portion 17e to the load bearing surface 4i and borne by the reel shaft 4. In such a load bearing structure, since the teeth 17d, which serve as a point of application of load, and the load transfer portion 17e are relatively close to each other, substantially no bending force applies on the main pawl 17, but only compressive force is applied thereon substantially. Furthermore, since the load transfer portion 17e and the load bearing surface 4i are in plane contact with each other, the load is transferred to the reel shaft 4 through a relatively wide area and hence dispersed, so that the stress produced therein is relatively small. Accordingly, the level of strength required for the main pawl 17 is lower than that of the conventional main pawl, and thereby the main pawl 17 can be formed by using a relatively lightweight material, e.g., a resin material.

Further, the main pawl 17 has a columnar cam follower 17f projecting from a side thereof which is opposite to the side where the load transfer portion 17e is provided. The cam follower 17f is fitted into the third cam hole 14n of the lock gear 14 so as to be guided along the cam hole 14n.

Further, a large out-of-position preventing portion 17g formed in a web-like shape is disposed on an edge of a surface, where the teeth 17d are disposed, at the load transfer portion 17e side. The large out-of-position preventing portion 17g is positioned inside of the right-hand side wall 2a as shown by the two-dot chain line in FIG. 3 when the teeth engage with the teeth 2f of the right-hand side wall 2a. Thereby, even if the main pawl 17 moves by an unbalanced load or the like in a direction which it is apart from the right-hand guide flange 4b so that the teeth 17d is not right place relative to the teeth 2a, the large out-of-position preventing portion 17g prevents the engagement between the teeth 17d and the teeth 2f from being out of position because the large out-of-position preventing portion 17g abuts on the inner surface of the right-hand side wall 2a.

The pawl spring 18 is accommodated in the first recess 4g of the reel shaft 4 and fitted to the spring guide portion 14q of the lock gear 14 so as to be compressedly loaded between the wall surface of the first recess 4g and the spring retaining portion 14p. Accordingly, the pawl spring 18 constantly biases the main pawl 17 relative to the reel shaft 4 in the webbing unwinding direction α. Thus, the main pawl 17 is normally set at the non-engaging position by the biasing force of the pawl spring 18.

As shown in FIG. 15, the joint pin 19 has a body 19a that is formed with a circular cross-sectional configuration. The body 19a is formed at the right-hand end thereof, as viewed in FIG. 15(a), with an arm 19b that extends at right angles to the body 19a. A cam follower 19c having a circular cross-sectional configuration is provided at the distal end of the arm 19b. The cam follower 19c is fitted into the second cam hole 14m of the lock gear 14 so as to be guided along the cam hole 14m. Further, a shaft portion 19d having rectangular cross-sectional configuration is formed at the other end of the body 19a. The shaft portion 19d is fitted into a hole formed in one end portion of the backup pawl 20, described later, so as to be unable to rotate relative to the backup pawl 20. Accordingly, when the arm 19b pivots in response to the movement of the cam follower 19c guided along the second cam hole 14m, the body 19a rotates, and the rotation of the body 19a is transferred to the backup pawl 20. Thus, the backup pawl 20 pivots corresponding to the movement of the cam follower 19c guided along the second cam hole 14m.

As shown in FIG. 16, the backup pawl 20 is formed in a substantially fan-like shape and has a boss portion 20b formed in a portion which serves as a pivot. The boss portion 20b has a through-hole 20a of rectangular cross-section. The backup pawl 20 has a pawl portion 20c formed at an end thereof opposite to the pivot. Further, teeth 20d which are engageable with the teeth 2g of the left-hand side wall 2b of the frame 2 are formed at the distal end of the pawl portion 20c. As shown in FIG. 1b, the shaft portion 19d of the joint pin 19 is fitted into the through-hole 20a of the boss portion 20b so as to be unable to rotate relative to the backup pawl 20. The backup pawl 20 is fixed to the joint pin 19 by a screw 23. Accordingly, the backup pawl 20 is disposed with the joint pin as the center to be rockable between a non-engaging position as shown in FIG. 8(b) by the two-dot chain line and the engaging position as shown by the dotted line relative to the left-hand guide flange 4c of the reel shaft 4. At the non-engaging position of the backup pawl 20, the teeth 20d formed at the distal end thereof is positioned entirely inside from the outer peripheral surface of the guide flange 4c to reach a position where it does not engage with the teeth 2g of the left-hand side wall 2b of the frame 2. At the engaging position of the backup pawl 20, the teeth 20d project outwardly from the outer peripheral surface of the guide flange 4c to reach a position where it engages with the teeth 2g.

In addition, the backup pawl 20 has a load transfer portion 20e formed at an end opposite to the teeth 20d of the pawl portion 20c. The load transfer portion 20e is formed from a circular arc which is a part of a circle concentrical with respect to the through-hole 20a and the boss portion 20b. When the backup pawl 20 is attached to the left-hand guide flange 4c, the load transfer portion 20e abuts on the load bearing surface 4p of the left-hand guide flange 4c. Since the load transfer portion 20e and the load bearing surface 4p are formed from circular arcs of the same circle, the load transfer portion 20e abuts on the load bearing surface 4p at all times irrespective of the position of the backup pawl 20. Thus, since the load transfer portion 20e abuts on the load bearing surface 4p, a load applied to the pawl portion 20c of the backup pawl 20 is transferred from the load transfer portion 20e to the load bearing surface 4p and borne by the reel shaft 4. Also in the backup pawl 20, the stress produced therein is relatively small as well as the main pawl 17 as described above. Accordingly, the backup pawl 20 can be formed by using a relatively lightweight material, e.g., a resin material.

Further, a large out-of-position preventing portion 20g formed in a web-like shape is disposed on an edge of a tooth 20d at the load transfer portion 20e side. The large out-of-position preventing portion 20g is positioned inside of the left-hand side wall 2b as shown by the two-dot chain line in FIG. 3 when the teeth 20d engage with the teeth 2g of the left-hand side wall 2b. Thereby, even if the backup pawl 20 moves by an unbalanced load or the like in a direction apart from the left-hand guide flange 4c so that the teeth 20d are not right place relative to the teeth 2g, the large out-of-position preventing portion 20g prevents the engagement between the teeth 20d and the teeth 2g from being out of position because the large out-of-position preventing portion 20g abuts on the inner surface of the right-hand side wall 2a.

Figure 17:
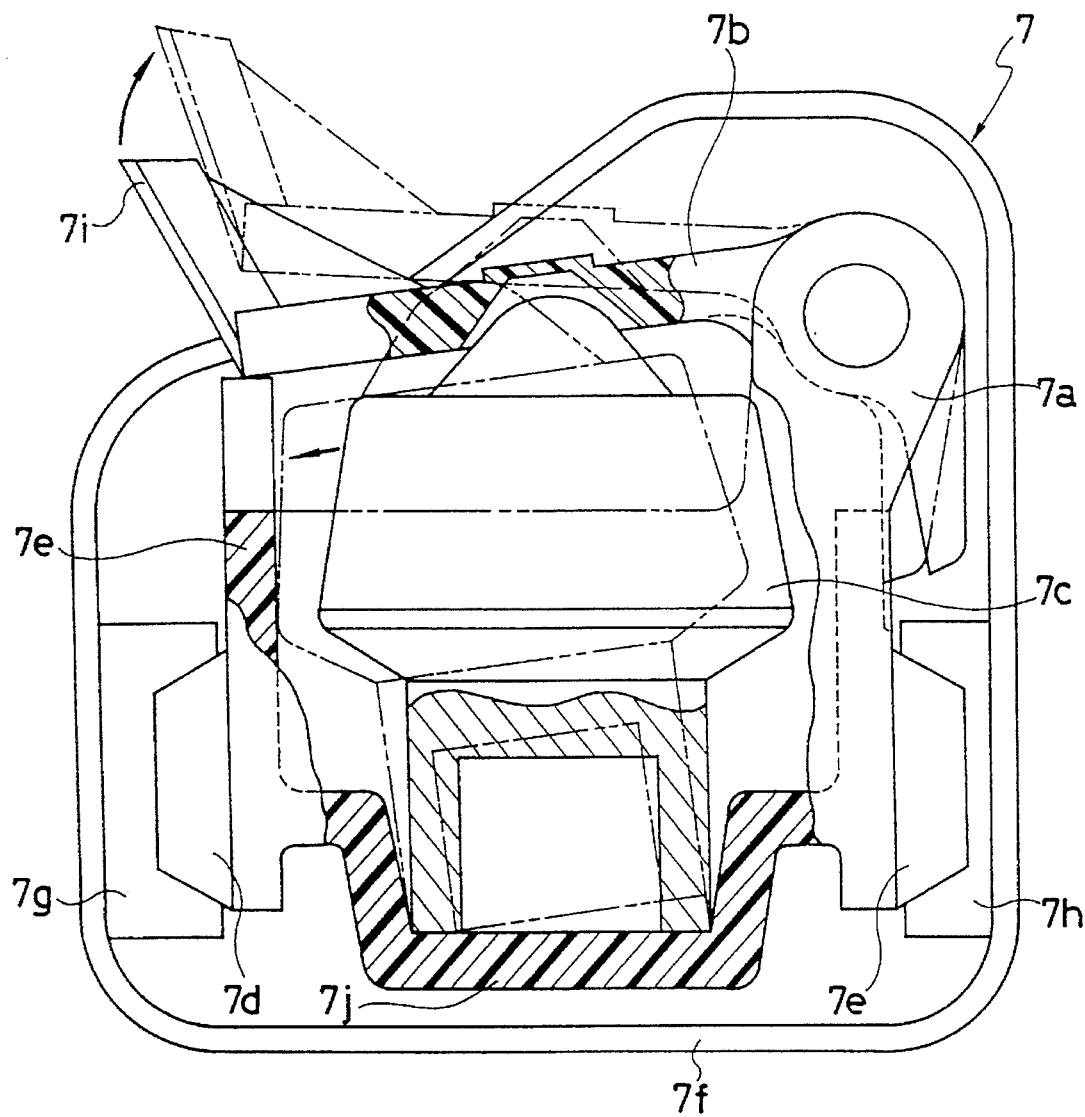
FIG. 17 is a partly-cutaway view of a deceleration sensing means employed in the embodiment.

As shown in FIG. 17, the deceleration sensing means 7 has a casing 7a, lever 7b which is pivotably supported by the casing 7a, and an inertia member 7c which is accommodated in the casing 7a so that when the vehicle is in a normal state, the inertia member 7c is in the position shown by the solid line, whereas, when deceleration exceeding a predetermined value acts on the vehicle, the inertia member 7c tilts to the position shown by the two-dot chain line.

Engaging projections 7d and 7e are fitted into the recesses of guide members 7g and 7h of a supporting member 7f so that the casing 7a is supported by the supporting member 7f. The supporting member 7f is fixed to the right-hand side wall 2a. The lever 7b has a rear end rotatably supported to the casing 7a and is provided with a pawl 7i, which is engageable with the teeth 14c of the lock gear 14, at a front end thereof.

The inertia member 7c is mounted on a mounting portion 7j of the casing 7a. In a normal state, the inertia member 7c erects perpendicularly to the mounting portion 7j, as shown by the solid line, and supports the lever 7b in a substantially horizontal position shown by the solid line. In this solid-line position, the lever 7b is placed in a non-engaging position where the pawl 7i does not engage with the teeth 14c of the lock gear 14.

When a predetermined degree of deceleration acts on the vehicle, the inertia member 7c tilts until the outer peripheral surface of the upper portion thereof substantially abuts on the inner surface of the front wall of the casing 7a, as shown by the two-dot chain line. The tilting of the inertia member 7c causes the lever 7b to push up. Accordingly, the lever 7b pivots to the position shown by the two-dot chain line. In the two-dot chain line position, the lever 7b is engageable with a tooth 14c of the lock gear 14.

As shown in FIG. 1, the webbing guide 22 has a body 22b which is disposed between the two side walls 2a and 2b of the frame 2 and which has in its center a hole 22a that is passed through by the webbing 3. The webbing guide 22 further has projecting shafts 22c and 22d formed in elongated circular shapes in cross section, which project longitudinally from two ends, respectively, of the body 22b and which are slidably fitted into the guide hole 11a formed on the cover 11 of the power spring 8 and the guide holes 13f formed in the lock gear first cover 13, respectively.

The webbing guide 22 slides along the guide holes 11a, 13f in accordance with the roll diameter of the webbing 3 taken up on the reel shaft 4, thereby constantly guiding the webbing 3 along the axial direction of the hole 22a. Thereby, the guiding angle of the webbing 3 relative to the webbing guide 22 is substantially constant so that the webbing 3 is wound on or off smoothly and is protected from scuffing by the webbing guide 22.

Since the projecting shafts 22c and 22d are formed in elongated circular shapes, the webbing guide 22 never rotates about the projecting shafts 22c and 22d as an axis so as not to be tilted. Accordingly, the webbing guide 22 can smoothly slide along the guide holes 11a, 13f, thereby allowing the webbing 3 to be further smoothly wound on and off. When the webbing guide 22 slides, right and left end walls 22g and 22h of the body 22a are guided to the inner surfaces of the cover 11 of the frame 2 and the lock gear first cover 13, respectively, so as to prevent the webbing guide 22 from rotating about an vertical axis. Therefore, the webbing guide 22 can further smoothly slide along the guide holes 11a and 13f.

Next, the operations of the main pawl 17 and the backup pawl 20 will be explained in detail with reference to FIGS. 18(a)–18(g) and 18(a)'–18(h)'. It should be noted that FIGS. 18(a)–18(g) show the operation of the main pawl 17, whereas FIGS. 18(a)'–18(h)' show the operation of the backup pawl 20. In addition, the figures are schematic views in which the teeth 2f, the teeth 17d and the three cam holes 14k, 14m and 14n at the main pawl 17 side are illustrated on the same plane, and in which both the main pawl 17 and the backup pawl 20 are seen from the right-hand side as viewed in FIG. 3.

Figure 18A:
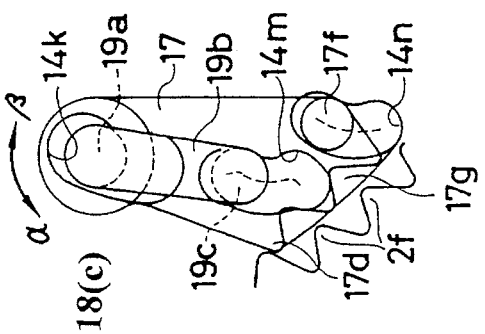
FIGS. 18($a$)–($g$) illustrate an operation of the main pawl in the embodiment.
Figure 18A:
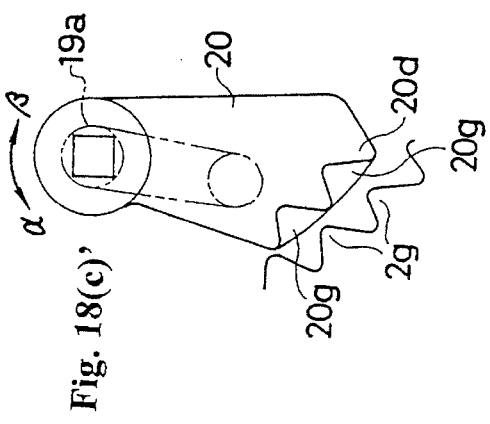

Referring to FIGS. 18(a)–18(d) and 18(a)'–18(d)' the reel shaft 4 (shown only the through-hole 4k, through which the body 19a of the joint pin 19 passes, and the main pawl 17, which is provided on the reel shaft 4 in FIGS. 18(a)–18(d) and 18(a)'–18(d)' is constantly biased in the webbing winding direction B relative to the lock gear 14 (shown only the cam holes 14k, 14m and 14n in FIGS. 18(a)–18(d) and 18(a)' –18(d)'by the spring force of the pawl spring 18 (not shown in FIGS. 18(a)–18(d) and 18(a)'– 18(d)' see FIG. 1B or the like). Therefore, the reel shaft 4 rotates in the webbing winding direction B relative to the lock gear 14 until the body 19a abuts on the upper end edge of the cam hole 14k, thus reaching a normal state as shown in FIG. 18(a).

In the normal state, the cam follower 19c of the joint pin 19 abuts on the upper end edge of the cam hole 14m, and the cam follower 17f of the main pawl 17 abuts on the upper end edge of the cam hole 14n. In addition, the teeth 17d of the main pawl 17 are far apart from the teeth 2f of the right'-hand side wall 2a, so that the main pawl 17 assumes a non-engaging position where the teeth 17d do not engage with the teeth 2f. On the other hand, the backup pawl 20 assumes the position shown in FIG. 18(a)' in accordance with the angle of rotation of the joint pin 19 that is determined by positions at which the cam followers 19c and 17f abut on the respective upper end edges of the cam holes 14m and 14n. That is, the pawl 20d of the backup pawl 20 is far apart from the teeth 2g of the left-hand side wall 2b so that the backup pawl 20 also assumes a non-engaging position where the pawl 20d does not engage with the teeth 2g.

Figure 18B:
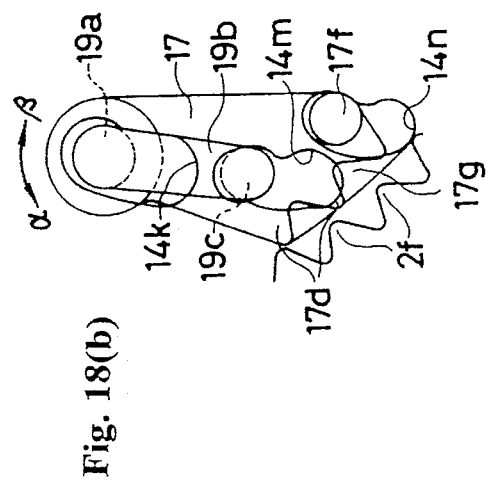
Figure 18B:
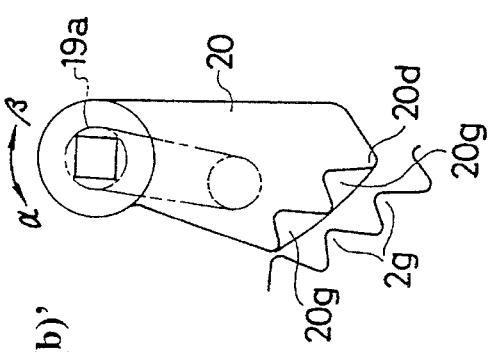

When the reel shaft 4 rotates in the webbing unwinding direction α relative to the lock gear 14 about the first rotating shaft 4d (not shown in FIG. 18(b) see FIG. 7), that is, when the through-hole 4k, which is pierced with the body 19a, rotates in the direction α relative to the first to third cam holes 14k, 14m and 14n of the lock gear 14 about the first rotating shaft 4d, the body 19a and the boss portion 17b of the main pawl 17 move a little downwardly along and relative to the first cam hole 14k, as shown in FIG. 18(b).

At the same time, the cam follower 17f moves a little downwardly by being guided by the third cam hole 14n. In this case, the boss portion 17b also moves a little leftwardly as viewed in the figure in accordance with the cam profile of the first cam hole 14k, and the cam follower 17f moves a little leftwardly in accordance with the cam profile of the third cam hole 14n. Since the amount of the leftward movement of the cam follower 17f is a little larger than that of the boss portion 17b, the main pawl 17 pivots a little in the direction B. Thereby, the teeth 17d approach the teeth 2f.

Further, at the same time, the cam follower 19c moves downwardly by being guided by the second cam hole 14m. In this case, since the cam follower 19c also moves rightwardly in accordance with the cam profile of the second cam hole 14m, the arm 19b pivots a little in the direction α about the body 19a. The pivoting motion of the arm 19b in the direction α causes the body 19a to rotate also a little in the direction α. However, the body 19a and the arm 19b do not substantially rotate relative to the reel shaft 4 because the reel shaft 4 also rotates in the direction α. Accordingly, the backup pawl 20 is held in the non-engaging position, as shown in FIG. 18(b).

Figure 18C:
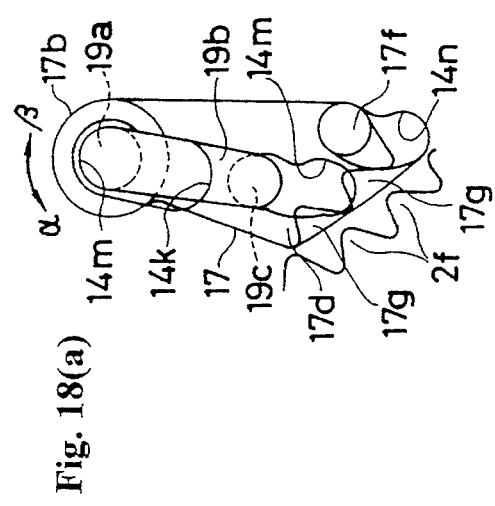
Figure 18C:
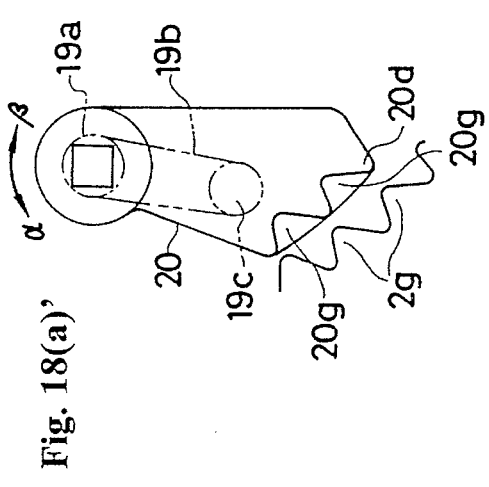

As shown in FIG. 18(c), as the reel shaft 4 further rotates in the direction α relative to the lock gear 14, the body 19a and the boss portion 17b further move downwardly and leftwardly along the first cam hole 14k, respectively. At the same time, the cam follower 17f further moves a little downwardly by being guided by the third cam hole 14n. Since the amount of the further leftward movement of the cam follower 17f is a little larger than that of the boss portion 17b, the main pawl 17 further pivots a little in the direction B, so that the teeth 17d further approach the teeth 2f.

Further, at the same time, the cam follower 19c further moves a little downwardly and leftwardly by being guided by the second cam hole 14m. In this case, since the cam follower 19c also moves a little downwardly and leftwardly in accordance with the cam profile of the second cam hole 14m, the arm 19b does not pivot substantially. However, since the reel shaft 4 further moves in the direction α, the body 19a and the arm 19b rotate in the direction B relative to the reel shaft 4. Thereby, the backup pawl 20 pivots a little in the direction B relative to the reel shaft 4, so that the teeth 20d approach the teeth 2g.

Figure 18F:
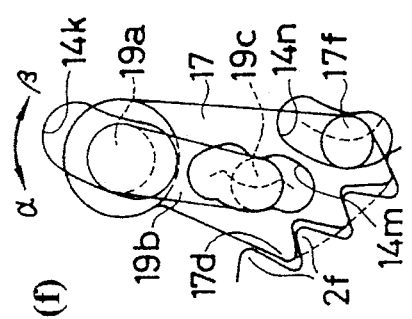
Figure 18F:
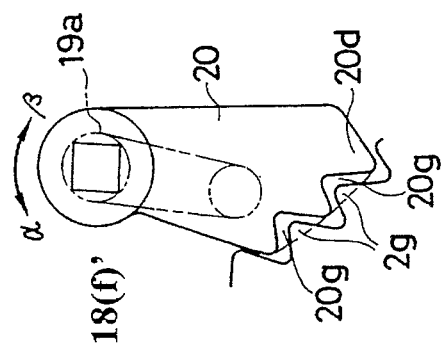
Figure 18E:
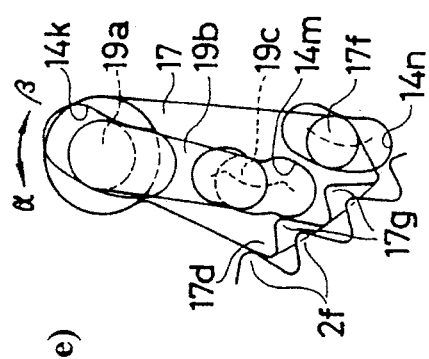
Figure 18E:
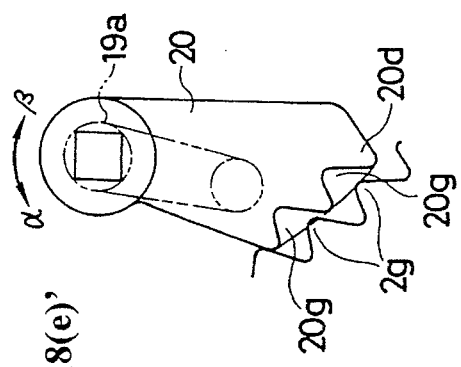
Figure 18D:
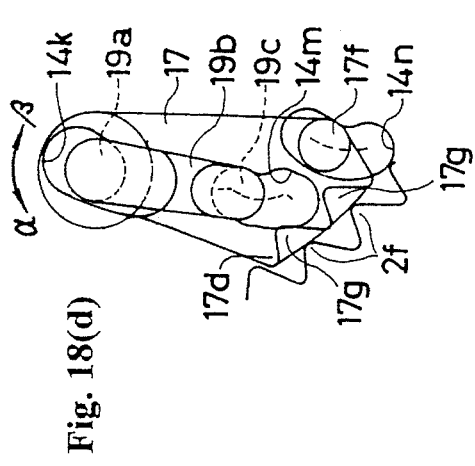
Figure 18D:
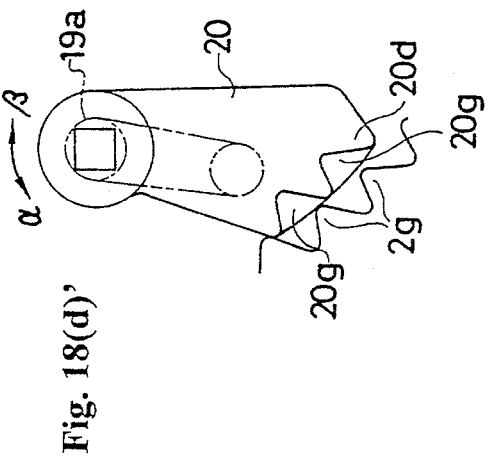

As shown in FIG. 18(d), when the reel shaft 4 further rotates in the direction α relative to the lock gear 14, the main pawl 17 further pivots a little in the direction B relative to the reel shaft 4 in the same way as the above, so that the teeth 17d engage the teeth 2f plainly. Similarly, the backup pawl 20 further pivots a little in the direction B, so that the teeth 20d begin to engage with the teeth 2g. In this manner, the teeth 20d of the backup pawl 20 starts to engage with the teeth 2g a little bit later than that the teeth 17d of the main pawl 17 engage with the teeth 2f.

As shown in FIG. 18(e), as the reel shaft 4 further rotates in the direction α relative to the lock gear 14, the main pawl 17 and backup pawl 20 further rotate in the direction B relative to the reel shaft 4 in the same way as the above. Accordingly, the amount of engaging the teeth 17d with the teeth 2f and the amount of engaging the teeth 20d with the teeth 2g increase respectively.

As shown in FIG. 18(f), the reel shaft 4 further rotates in the direction α, thereby the teeth 17d substantially engage with teeth 2f, while the amount of engaging the teeth 20d with the teeth 2g further increases.

Figure 18H:
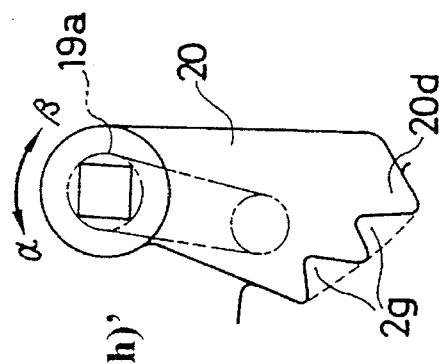
Figure 18G:
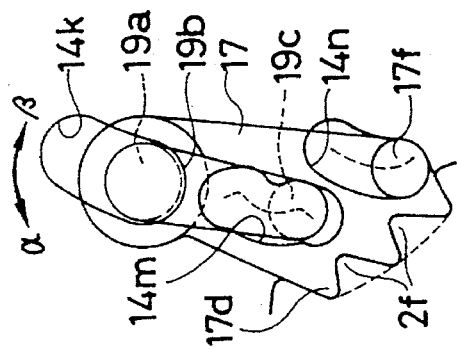
Figure 18G:
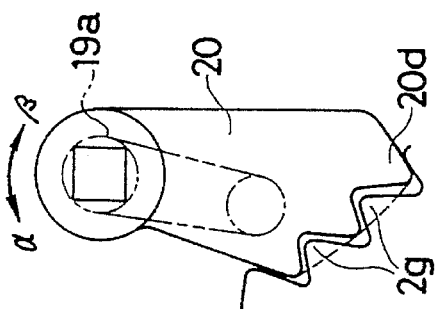
Figure 19:
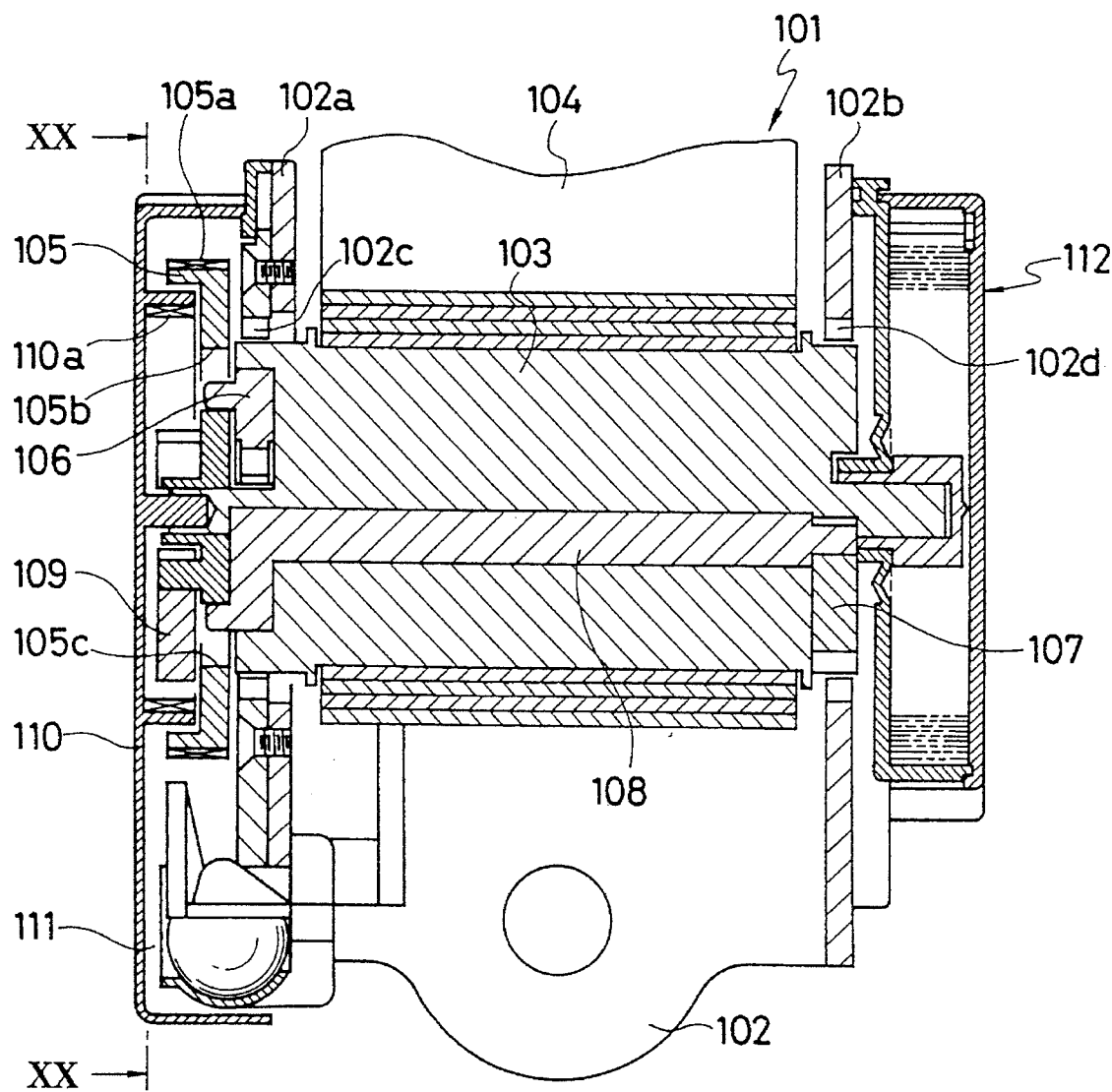
FIG. 19 is a partly-sectioned front view of a conventional seat belt retractor.
Figure 20:
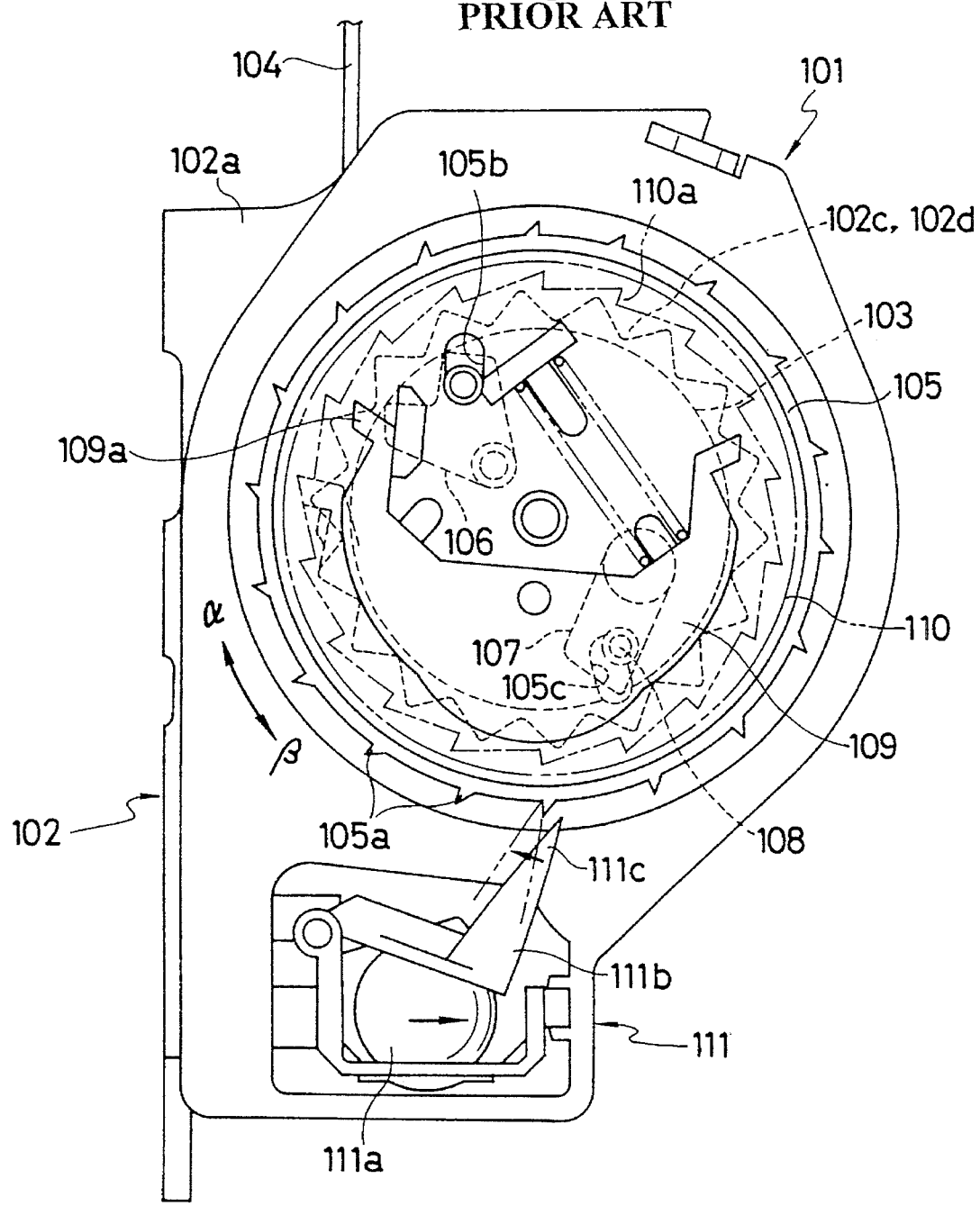
FIG. 20 is a side view of the conventional seat belt retractor.

As shown in FIG. 18(g), the reel shaft 4 further rotates in the direction α, thereby the teeth 17d completely engage with teeth 2f. Accordingly, main pawl 17 completely engages with the teeth 2f of the right-hand side wall 2a, while the teeth 20d substantially engage with teeth 2g.

As shown in FIG. 18(h), the reel shaft 4 further rotates in the direction α, thereby the complete engagement between the teeth 17d and the teeth 2f is maintained and the backup pawl 20 completely engages with the teeth 2g of the left-hand side wall 2b.

In this embodiment, in this manner, as the reel shaft 4 rotates in the direction α relative to the lock gear 14, the teeth 17d of the main pawl 17 first start to engage with the teeth 2f of the right-hand side wall 2a and the teeth 20d of the backup pawl 20 then start to engage with the teeth 2g of the left-hand side wall 2b. The teeth 17d completely engage with the teeth 2f, and then the teeth 20d completely engage with the teeth 2g. Thereby, it is not possible to cause an error at least in one of the engagement between the main pawl 17 and teeth 2f, and the engagement between the backup pawl 20 and the teeth 2g. Accordingly, these engagements are securely performed.

Next, the operation of the seat belt retractor in this embodiment, arranged as described above, will be explained.

[Normal state where no deceleration exceeding a predetermined value acts on the vehicle]

Figure 4:
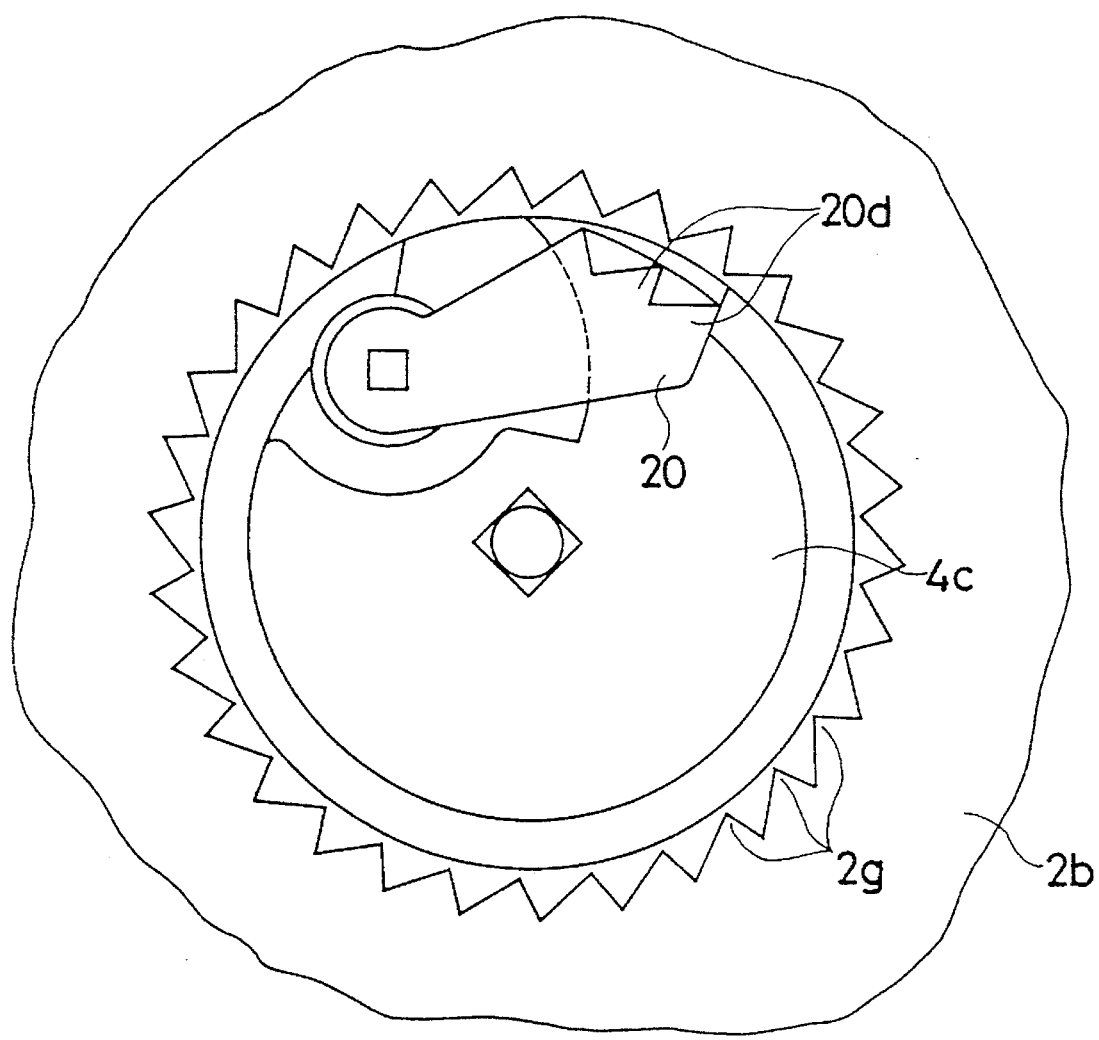
FIG. 4 is a fragmentary sectional view taken along the line IV—IV in FIG. 3, showing the assembled state of the seat belt retractor of the embodiment.

In this state, the inertia member 7c of the deceleration sensing means 7 does not tilt forwardly. Therefore, the lever 7b is held in the solid line position as shown in FIG. 2, and the pawl 7i is placed in the non-engaging position, which is apart from the teeth 14c of the lock gear 14. Similarly, the pawl 15b of the inertia member 15, the main pawl 17 and the backup pawl 20 are held in the non-engaging positions respectively, as shown in FIGS. 2 and 4.

Accordingly, in this state, the seat belt retractor 1 mainly performs an operation based on the action of the biasing force application means 5. That is, the reel shaft 4 is biased in the webbing winding direction B by the spring force of the power spring 8 of the biasing force application means 5 so as to wind up the webbing 3.

(When the seat belt is not fastened to the occupant's body)

In this state, a tongue (not shown), which is attached to the webbing 3, is separated from a buckle member (not shown). Accordingly, the webbing 3 has been wound up by the spring force of the power spring 8, as described above. In this state, the amount of winding up of the webbing is maximum. Therefore, the webbing guide 22 is positioned at the most right position of the stroke of the webbing guide 22 as shown in FIG. 2.

(When the webbing is unwound)

As the occupant unwinds the webbing 3 in order to fasten it to his/her body, the reel shaft 4 and the bush 9 rotate in the webbing unwinding direction α in response to the unwinding of the webbing 3. Thereby, the power spring 8 is gradually wound up. In this stage, the amount of the webbing 3 wound is decreased in response to the amount of the webbing 3 unwound. According to the decrease of the amount of wound webbing, the position of unwinding of the webbing 3 from the seat belt retractor 1 moves leftwardly as viewed in FIG. 2. The change of the position of unwinding of the webbing 3 causes the webbing guide 22 to move leftwardly as viewed in FIG. 2.

(When the occupant takes his/her hand off the webbing after connecting the tongue with the buckle member)

At the time when the occupant connects together the tongue and the buckle member, the webbing 3 has been unwound in excess of the length of the webbing 3 required when the occupant has fastened to his/her body in a normal state. Therefore, when the occupant takes his/her hand off the webbing 3 after connecting the tongue with the buckle member, the webbing 3 is wound up by the spring force of the power spring 8 until it fits to the occupant's body. The spring force of the power spring 8 is properly set so that the webbing 3 will not give a of pressure to the occupant. In winding up the webbing 3 by the power spring 8, the position of unwinding the webbing 3 from the seat belt retractor 1 moves rightwardly as viewed in FIG. 2. The change of the position of unwinding the webbing 3 causes the webbing guide 22 to move rightwardly as viewed in FIG. 2.

During the running of the vehicle, the seat belt retractor 1 maintains this state unless deceleration exceeding a predetermined value acts on the vehicle. When the occupant normally moves forward, the webbing is unwound freely so that the occupant can freely change his or her sitting position. Also during the forward movement of the occupant's body, the position of unwinding the webbing 3 from the seat belt retractor 1 moves leftwardly. The change of the position of unwinding the webbing 3 causes the webbing guide 22 to move leftwardly as viewed in FIG. 2.

[When deceleration exceeding a predetermined value acts on the Vehicle]

When deceleration exceeding a predetermined value acts on the vehicle during the running due to a sudden braking operation or the like, both the seat belt lock activating means 6 and the deceleration sensing means 7 operate. As a first stage of the operation, the inertia member 7c of the deceleration sensing means 7 moves forwardly (the position shown by the two-dot chain line in FIG. 2) by its inertia, so that the lever 7b pivots upwardly to reach the position shown by the two-dot chain line in FIG. 2. Thereby, the pawl 7i of the lever 7b assumes an engaging position where it is engageable with a tooth 14c of the lock gear 14. While, the occupant's body is urged to move forwardly by the deceleration acting on the vehicle to a degree higher than a predetermined value, thus causing the webbing 3 to be unwound. The unwinding of the webbing 3 causes both the reel shaft 4 and the lock gear 14 to rotate in the unwinding direction α.

However, since a tooth 14c of the lock gear 14 engages with the pawl 7i immediately, the lock gear 14 is immediately stopped from rotating in the unwinding direction α. As a result, only the reel shaft 4 continuously rotates in the unwinding direction α. Thus, the reel shaft 4 rotates in the direction α relative to the lock gear 14.

The relative rotation of the reel shaft 4 in the direction α causes the main pawl 17 to pivot in the direction B relative to the reel shaft 4 and to engage with the teeth 2f, as a second stage of the operation, as shown in FIGS. 18(a)–18(g). Thereafter, with a little delay, the backup pawl 20 pivots in the direction B relative to the reel shaft 4 and thereby engages with the teeth 2g. Thereby, the reel shaft 4 is locked from rotating in the webbing unwinding direction α. As a result, unwinding of the webbing 3, which would otherwise be caused by the inertial forward movement of the occupant's body, is surely prevented. Thus, the occupant's body is reliably restrained and protected. At this time, since the webbing 3 is unwound very little, the webbing guide 22 moves very little. [When unwinding force suddenly acts on the webbing]When such a situation occurs, since the webbing 3 is suddenly unwound, the reel shaft 4, the lock gear 14 and the inertia member 15 are suddenly urged to rotate in the webbing unwinding direction α. However, since the spring force of the control spring 16 is not so strong, the control spring 16 contracts, so that the inertia member 15 has an inertia delay. That is, the inertia member 15 not only revolves in the webbing unwinding direction α together with the lock gear 14 but also rotates in the direction B relative to the lock gear 14.

The rotation of the inertia member 15 causes the pawl 15b to move to the engaging position where it abuts on the second stopper 4i, and engage with a tooth 13c of the lock gear first cover 13, as shown by the two-dot chain line in FIG. 2. Thereby, the revolution of the inertia member 15 and the rotation of the lock gear 14 in the webbing unwinding direction α are stopped. Accordingly, only the reel shaft 4 rotates in the webbing unwinding direction α. Thus, the reel shaft 4 rotates in the direction α relative to the lock gear 14 as described above.

The relative rotation of the reel shaft 4 in the direction α causes the main pawl 17 to pivot and engage with the teeth 2f, and thereafter, with a little delay, the backup pawl 20 engages with the teeth 2g, in the same manner as described above. Thus, the reel shaft 4 is locked from rotating in the webbing unwinding direction α. As a result, unwinding of the webbing 3, which would otherwise be caused by the inertial forward movement of the occupant's body, is surely prevented. Thus, the occupant's body is reliably restrained and protected. In this case also, since the webbing 3 is unwound very little, the webbing guide 22 moves very little.

By the way, in this embodiment, the number of the teeth 13c of the lock gear first cover 13 is decreased so that the operational delay is caused by sudden unwinding of the webbing 3. This is because it takes a little time before the pawl 15b of the inertia member 15 engages with the teeth 13c. However, the delay in this degree, that is, the amount of the rotation of the reel shaft 4 does not cause the webbing 3 to be substantially unwound, so that the function of the webbing sensor comprising the inertia member 15 and the lock gear first cover 13 is not influenced.

The present invention can be adapted to any seat belt retractor which has a lock gear, an inertia member and a lock gear first cover. As apparent from the foregoing description, according to the seat belt retractor according to the present invention, the number of the teeth for preventing the lock gear from rotating is set less than the number of the teeth for preventing the reel shaft from rotating, so that the frequency of occurrences of the end lock can decrease substantially.

Further, since the number of the teeth for preventing the lock gear from rotating can be reduced, the device can be processed easily.

What we claims is:

1. A seat belt retractor comprising:

a reel shaft for a webbing winding;

a frame for rotatably supporting both ends of said reel shaft;

locking means for preventing said reel shaft from rotating in a webbing unwinding direction at a time when it is necessary to prevent said reel shaft from rotating; and an activating device for activating said locking means:

said locking means having reel shaft-rotating preventing teeth which are provided on said frame, and a pawl engaging with said reel shaft-rotating preventing teeth at said time so as to prevent said reel shaft from rotating in the webbing unwinding direction;

said activating device having a lock gear for engaging said pawl with said reel shaft-rotating preventing teeth, a predetermined number of lock gear-rotating preventing teeth, and an inertia member having a pawl for engaging with said lock gear-rotating preventing teeth;

the number of said lock gear-rotating preventing teeth being set to be less than the number of said reel shaft-rotating preventing teeth.

2. A seat belt retractor as claimed in claim 1, wherein said lock gear is disposed on said reel shaft to rotate coaxially with and relative to said reel shaft for engaging said pawl of said locking means with said reel shaft-rotating preventing teeth during relative rotation of said reel shaft, and said lock gear-rotating preventing teeth being provided on said frame in an annular shape and being concentrical relation with said lock gear.

3. A seat belt retractor as claimed in claim 2, wherein said number of said lock gear-rotating preventing teeth is set to be a common divisor of the number of said reel shaft-rotating preventing teeth.

4. A seat belt retractor as claimed in claim 2, wherein said lock gear-rotating preventing teeth are set coaxially with said reel shaft-rotating preventing teeth.

5. A seat belt retractor as claimed in claim 2, wherein said lock gear-rotating preventing teeth are disposed in an annular shape at equal pitches.

6. A seat belt retractor as claimed in claim 2, wherein said inertia member is disposed rockably on said lock gear.

7. A seat belt retractor as claimed in claim 2, further comprising deceleration sensing means which works when deceleration exceeding a predetermined value acts on the vehicle, and webbing-unwinding sensing means including said inertia member which works when the webbing is unwound in excess of a predetermined speed, said activating device activating said locking means in accordance with working of said deceleration sensing means or said webbing unwinding sensing means.

* * * * *